(12) United States Patent
Brocklebank et al.

(10) Patent No.: US 8,827,595 B2
(45) Date of Patent: Sep. 9, 2014

(54) APPARATUS AND METHOD FOR USE IN LAYING PIPE ON THE SEA FLOOR

(75) Inventors: David Brocklebank, Aberdeenshire (GB); Jonathan Richard Tame, Aberdeenshire (GB)

(73) Assignee: Subsea 7 Limited, Sutton (GB)

( * ) Notice: Subject to any disclaimer, the term of this patent is extended or adjusted under 35 U.S.C. 154(b) by 590 days.

(21) Appl. No.: 12/995,554

(22) PCT Filed: Jun. 3, 2009

(86) PCT No.: PCT/EP2009/056793
§ 371 (c)(1), (2), (4) Date: Mar. 21, 2011

(87) PCT Pub. No.: WO2009/147168
PCT Pub. Date: Dec. 10, 2009

(65) Prior Publication Data
US 2011/0158748 A1 Jun. 30, 2011

(30) Foreign Application Priority Data

Jun. 4, 2008 (GB) .................................. 0810201.4

(51) Int. Cl.
*F16L 1/23* (2006.01)
*F16L 1/235* (2006.01)
*F16L 1/20* (2006.01)
*F16L 1/19* (2006.01)

(52) U.S. Cl.
CPC ............... *F16L 1/207* (2013.01); *F16L 1/235* (2013.01); *F16L 1/23* (2013.01); *F16L 1/19* (2013.01)
USPC ...................... 405/168.4; 405/168.2; 405/166

(58) Field of Classification Search
USPC ............... 405/158, 166, 168.1, 168.2, 168.3, 405/168.4, 169, 170
See application file for complete search history.

(56) References Cited

U.S. PATENT DOCUMENTS

| 3,390,532 | A | * | 7/1968 | Benton | 405/166 |
| 3,487,648 | A | * | 1/1970 | Lawrence | 405/166 |

(Continued)

FOREIGN PATENT DOCUMENTS

| GB | 2019976 | 11/1979 |
| NL | 8303483 | 5/1985 |

(Continued)

OTHER PUBLICATIONS

International Searching Authority/European Patent Office, "Notification of Transmittal of the International Search Report and the Written Opinion of the International Searching Authority, or the Declaration," for PCT/EP2009/056793, mailed Nov. 13, 2009, 11 pages.

(Continued)

*Primary Examiner* — Frederick L Lagman
(74) *Attorney, Agent, or Firm* — Levy & Grandinetti

(57) ABSTRACT

When laying pipe from a pipelay vessel into the sea, the pipe is subject to torsion. To relieve this torsion an apparatus to perform controlled relative rotation between the pipe and the vessel is proposed, although it is also applicable to performing controlled relative rotation for other purposes, such as joint alignment. The pipe is secured in securing means, such as clamping means, adapted to support the weight of the pipe. The clamping means are mounted to the vessel via a mounting means, adapted to provide the controlled relative rotation and comprising a turntable, a brake assembly, a drive means and a thrust bearing, and a vessel support structure such as a vessel structural support trolley or a Top Hat element gripped by a hold off clamp.

21 Claims, 31 Drawing Sheets

(56) References Cited

U.S. PATENT DOCUMENTS

| | | | |
|---|---|---|---|
| 4,023,449 A | | 5/1977 | Boyadjieff |
| 4,264,234 A | * | 4/1981 | Pras ............................ 405/158 |
| 4,444,528 A | * | 4/1984 | Scodino et al. ............... 405/173 |
| 4,541,754 A | * | 9/1985 | Castel et al. ............... 405/168.1 |
| 5,181,798 A | | 1/1993 | Gilchrist |
| 5,823,712 A | * | 10/1998 | Kalkman et al. ............. 405/165 |
| 6,213,686 B1 | | 4/2001 | Baugh |
| 6,273,643 B1 | | 8/2001 | Baugh |
| 6,425,709 B1 | * | 7/2002 | Frijns ........................... 405/170 |
| 6,439,445 B1 | * | 8/2002 | De Groot et al. ............. 226/172 |
| 6,910,848 B1 | * | 6/2005 | Baugh ........................ 414/745.7 |
| 7,029,206 B2 | * | 4/2006 | Stockstill ...................... 405/169 |
| 7,189,028 B1 | * | 3/2007 | Signaroldi et al. ............ 405/166 |
| 7,293,940 B1 | * | 11/2007 | Perreau-Saussine et al. ......................... 405/224.2 |
| 8,104,995 B2 | * | 1/2012 | Roodenburg et al. ...... 405/168.4 |
| 2002/0009333 A1 | * | 1/2002 | Willis et al. ................... 405/158 |
| 2008/0118311 A1 | * | 5/2008 | Roodenburg et al. ......... 405/158 |
| 2010/0092244 A1 | * | 4/2010 | Willis ............................ 405/166 |
| 2011/0188941 A1 | * | 8/2011 | Tame ............................ 405/166 |

FOREIGN PATENT DOCUMENTS

| | | |
|---|---|---|
| WO | WO 2005/005874 | 1/2005 |
| WO | WO 2008/041837 | 4/2008 |

OTHER PUBLICATIONS

UK Intellectual Property Office, Search Report date Sep. 18, 2008, Application No. GB0810201.4, 1 page.

* cited by examiner

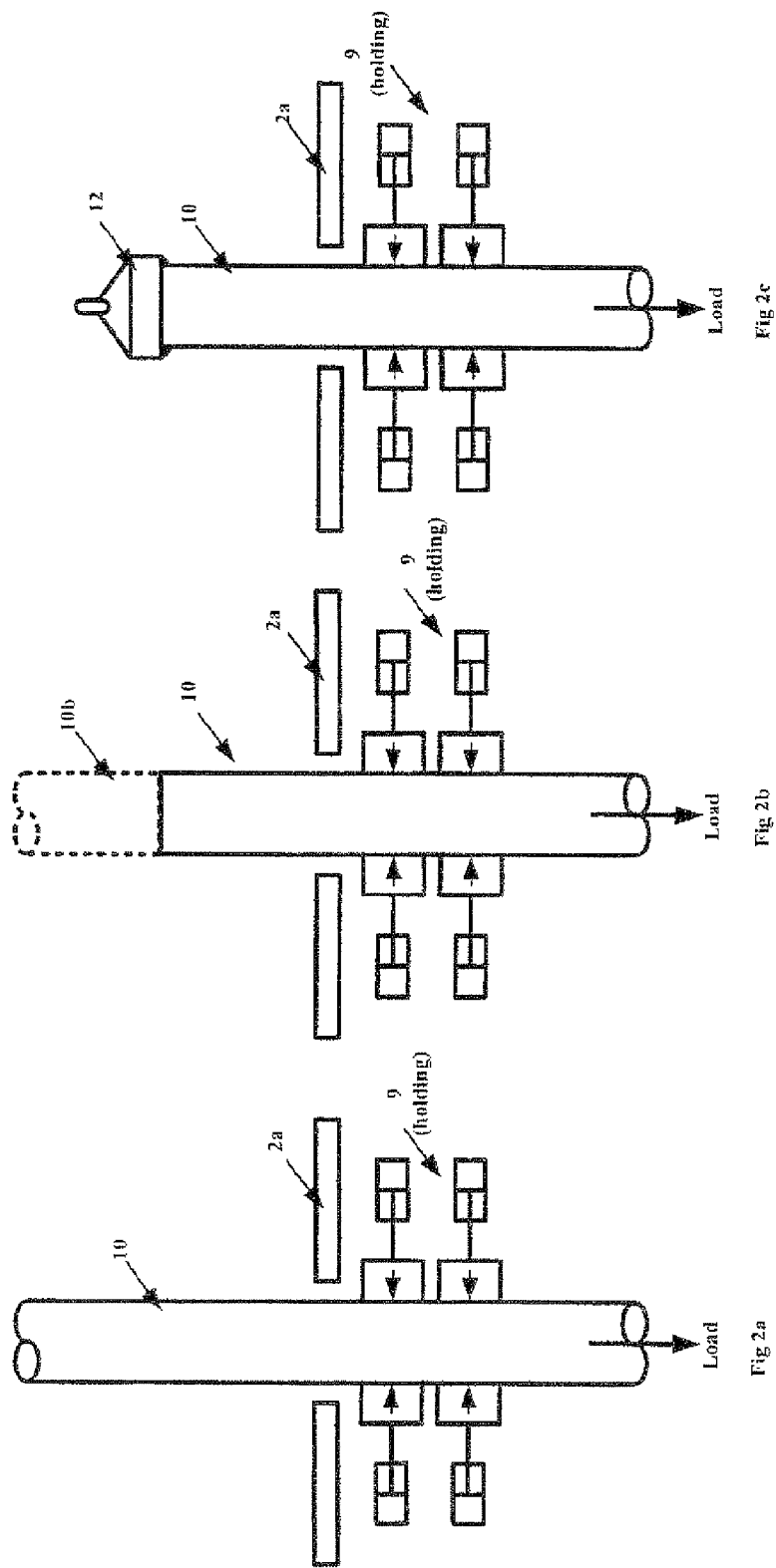

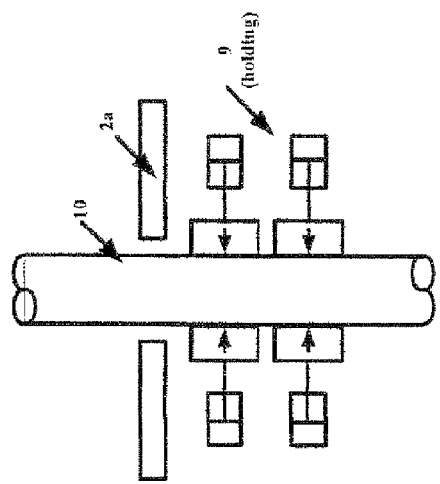
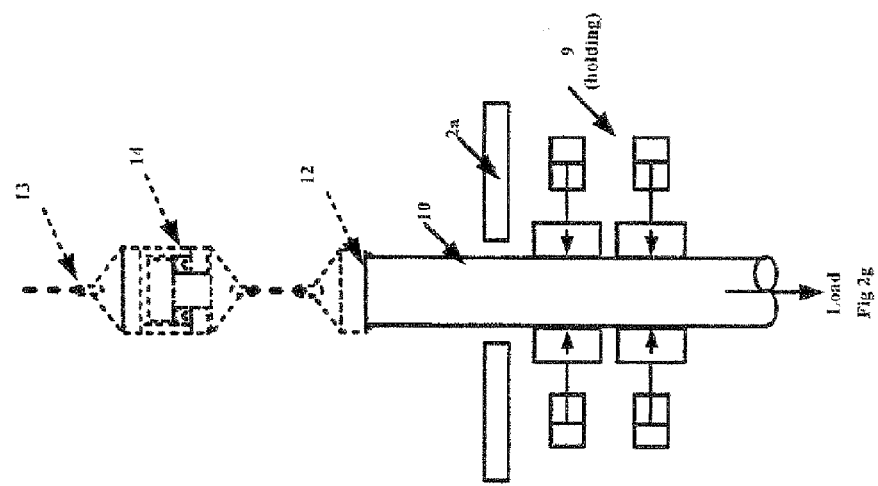

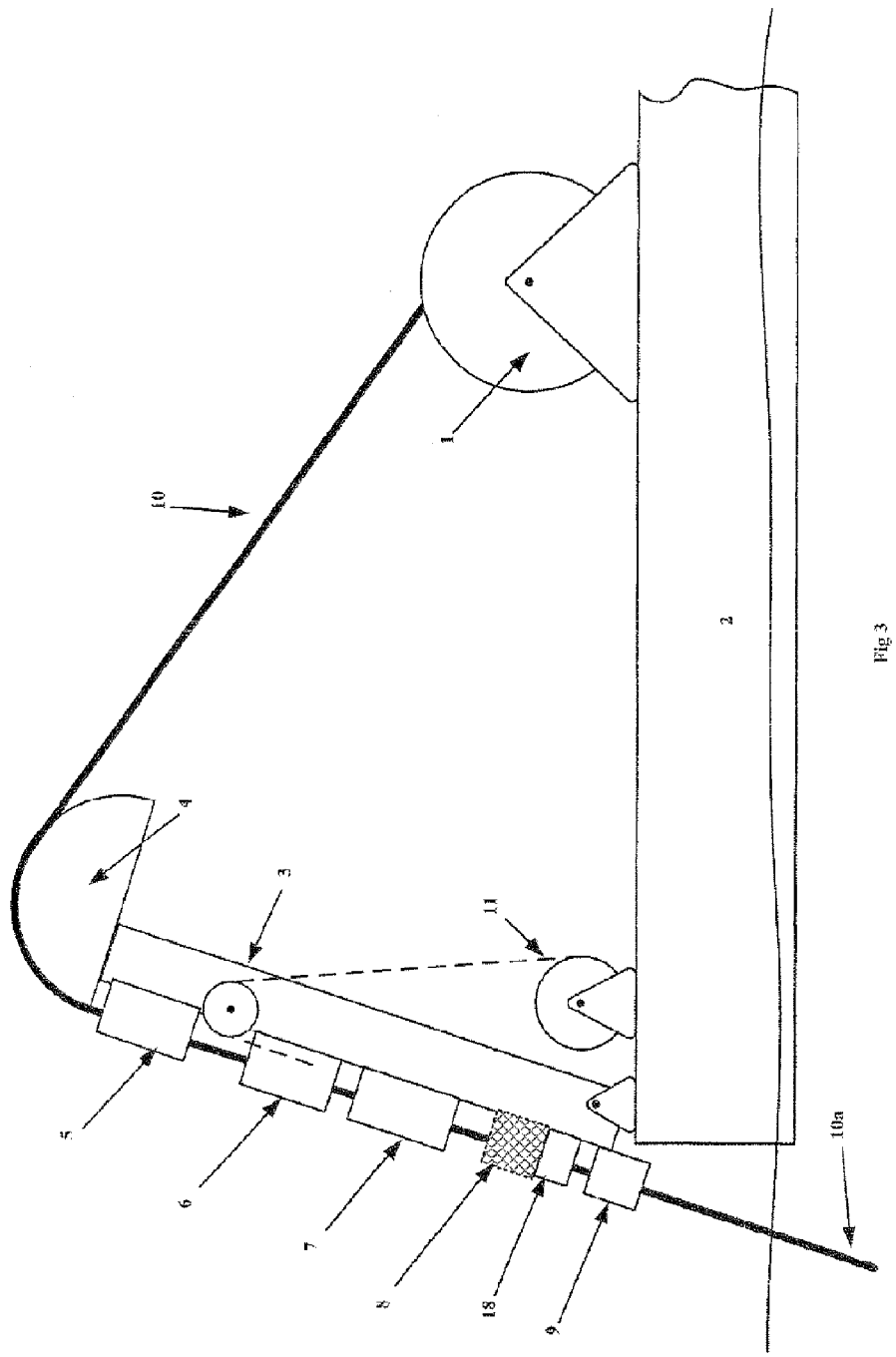

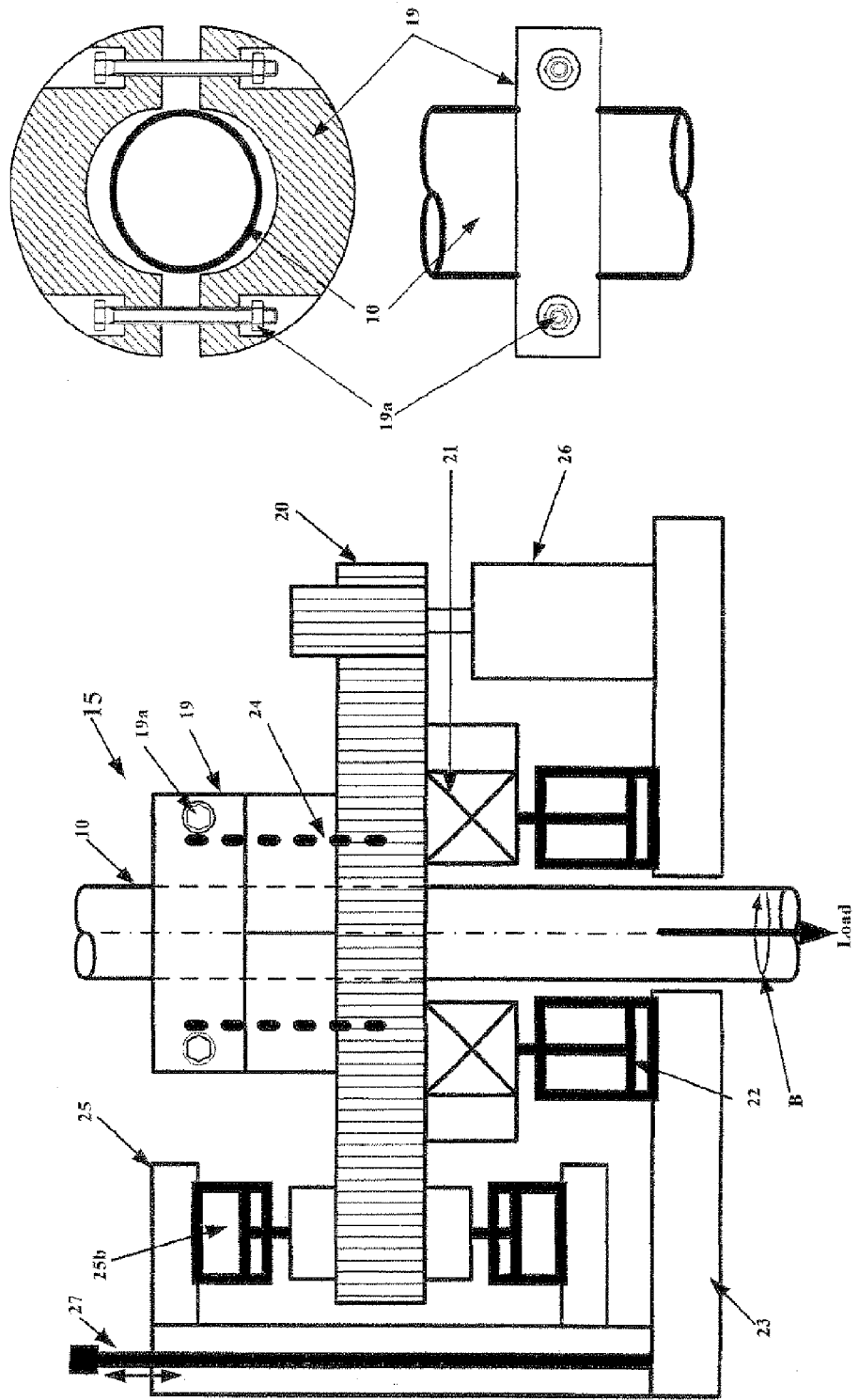

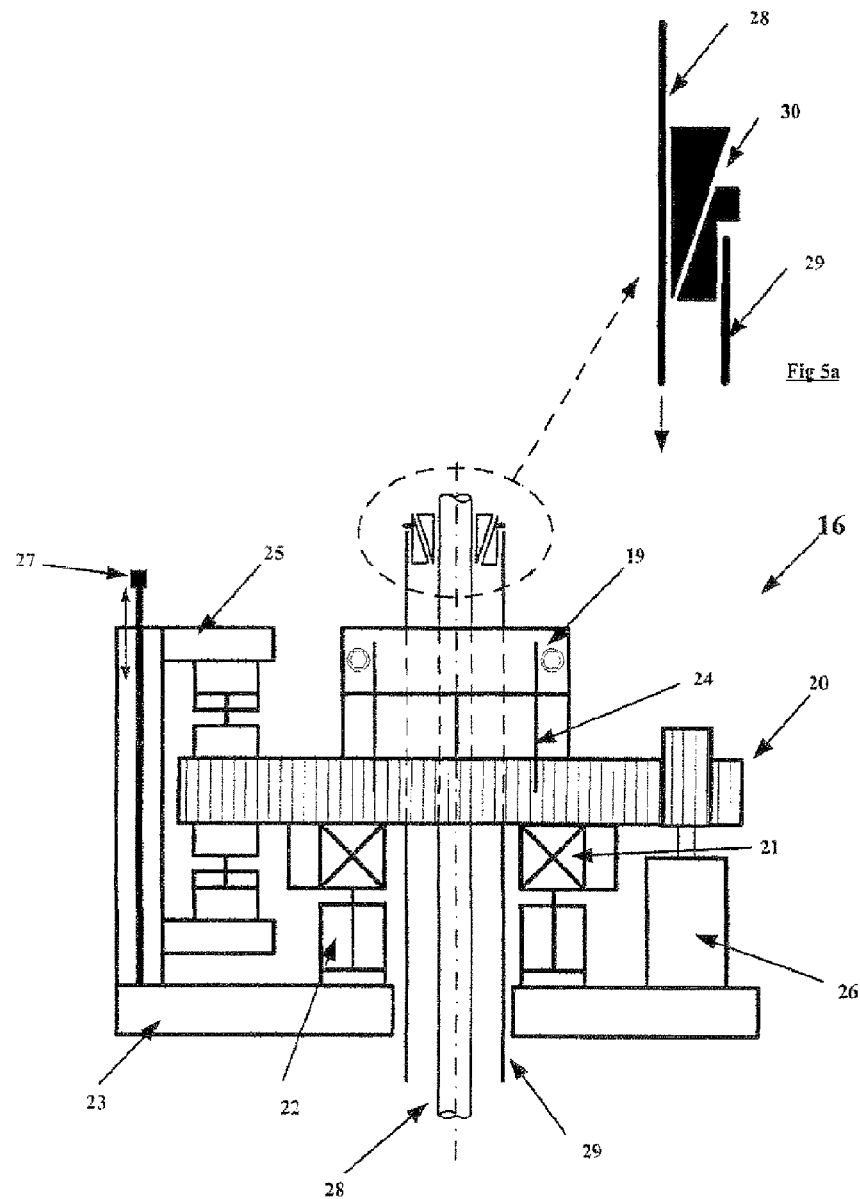

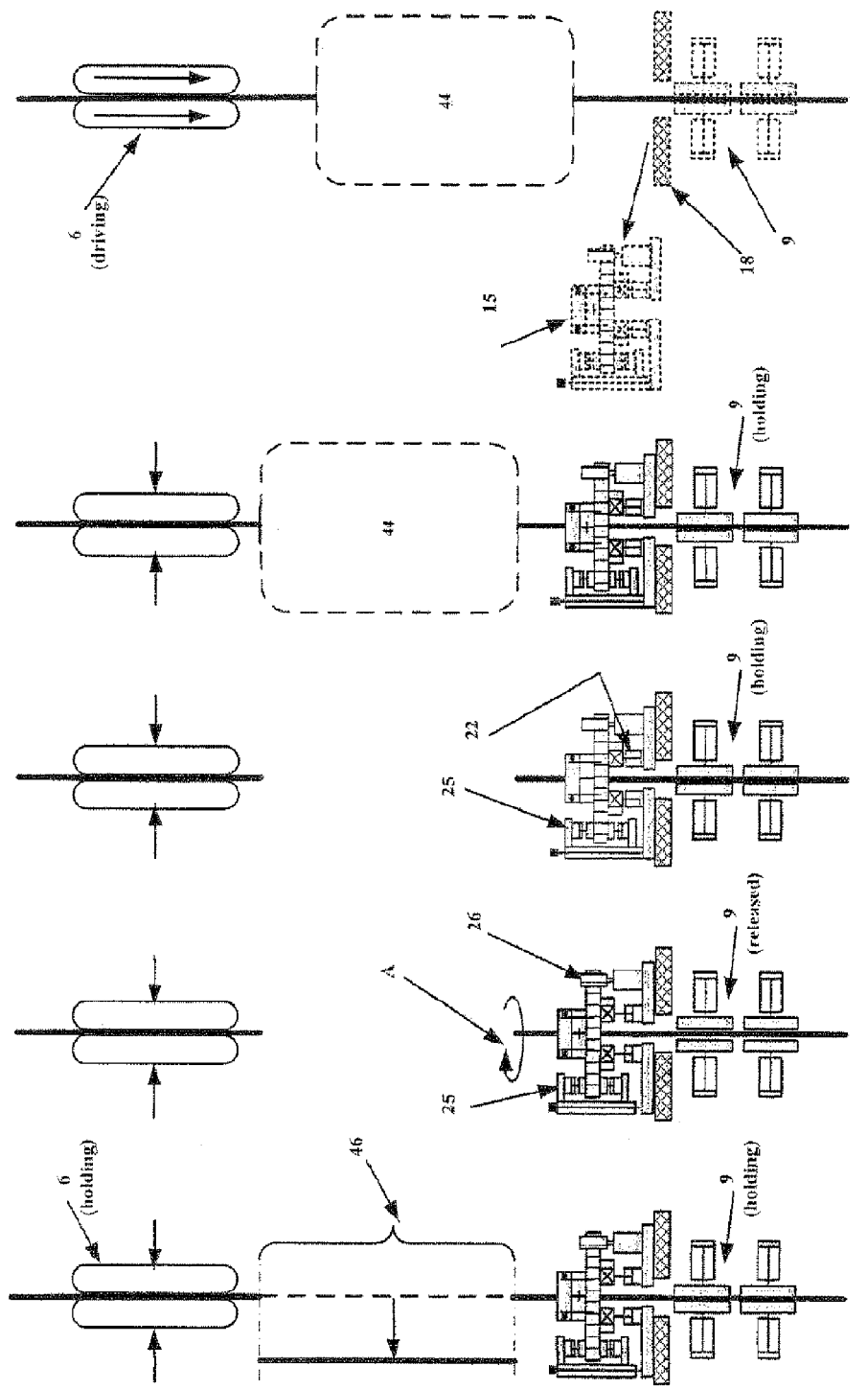

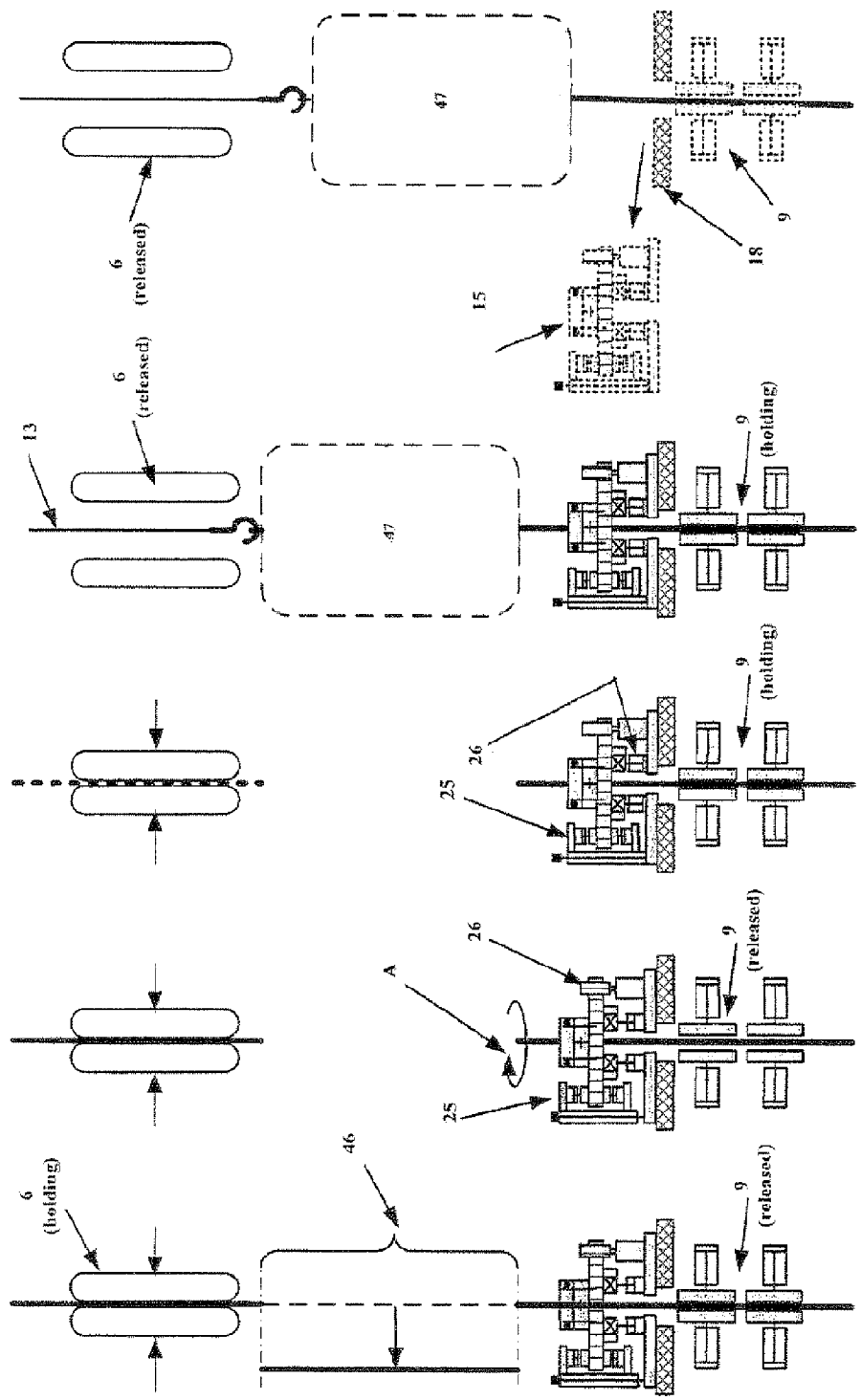

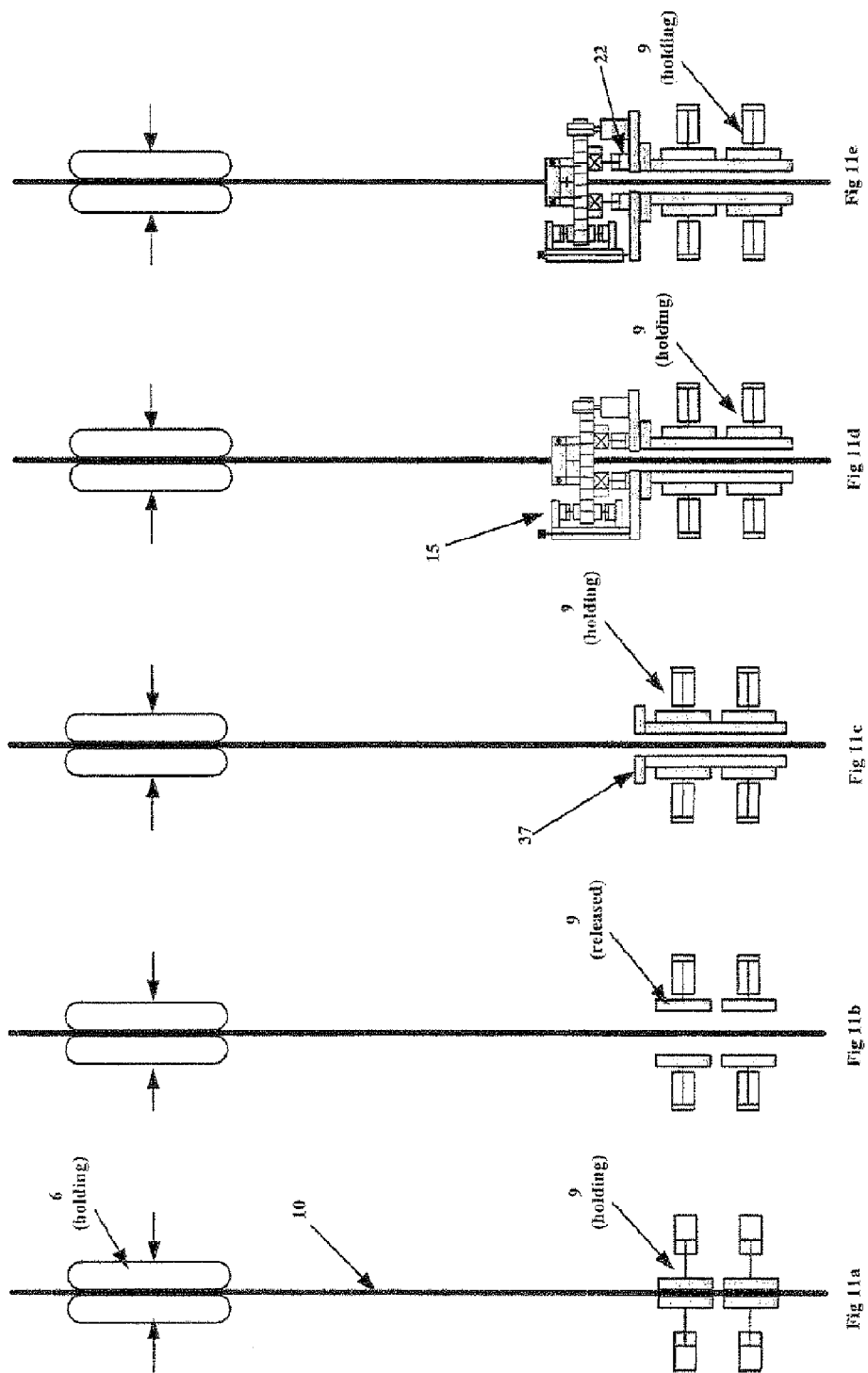

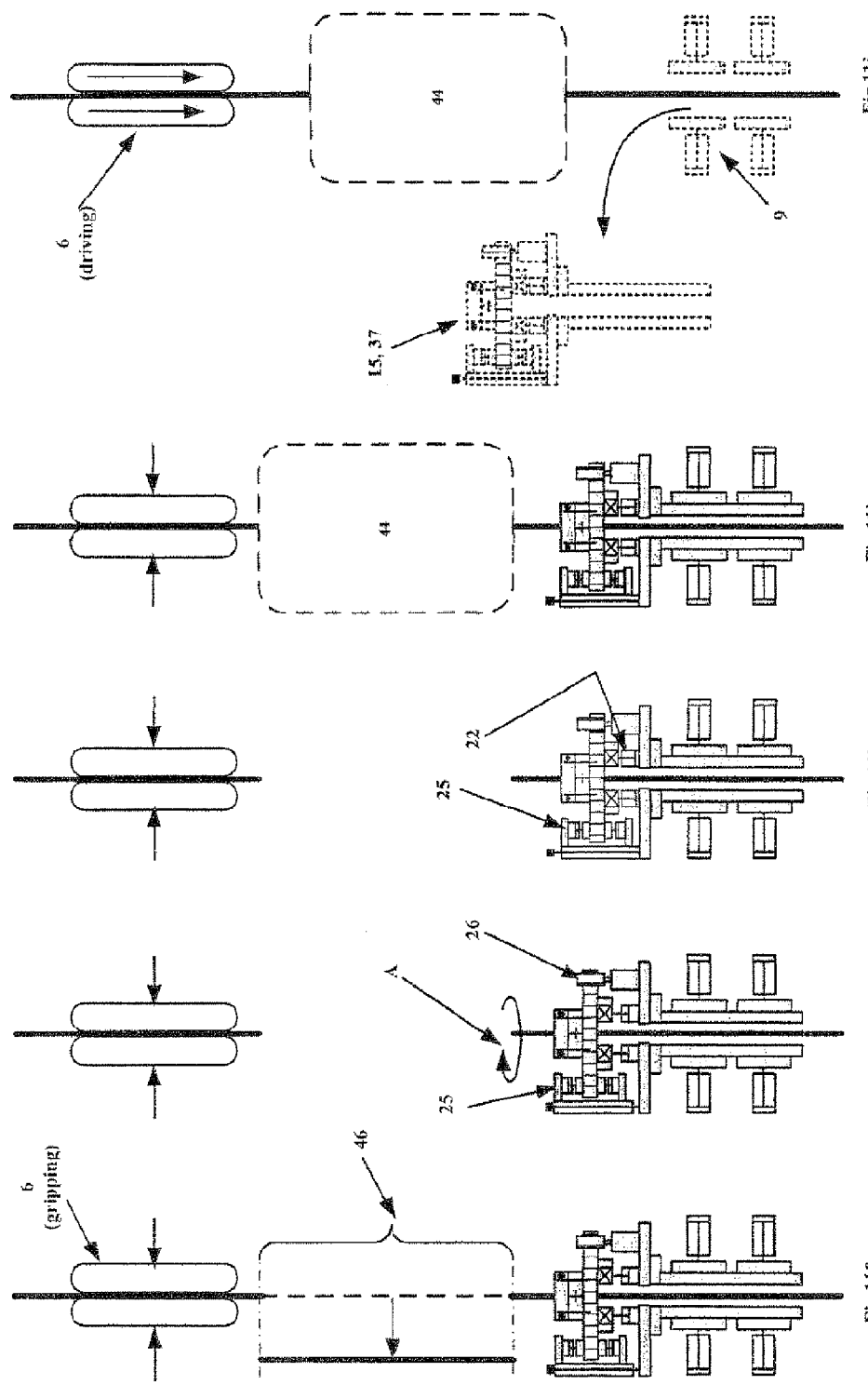

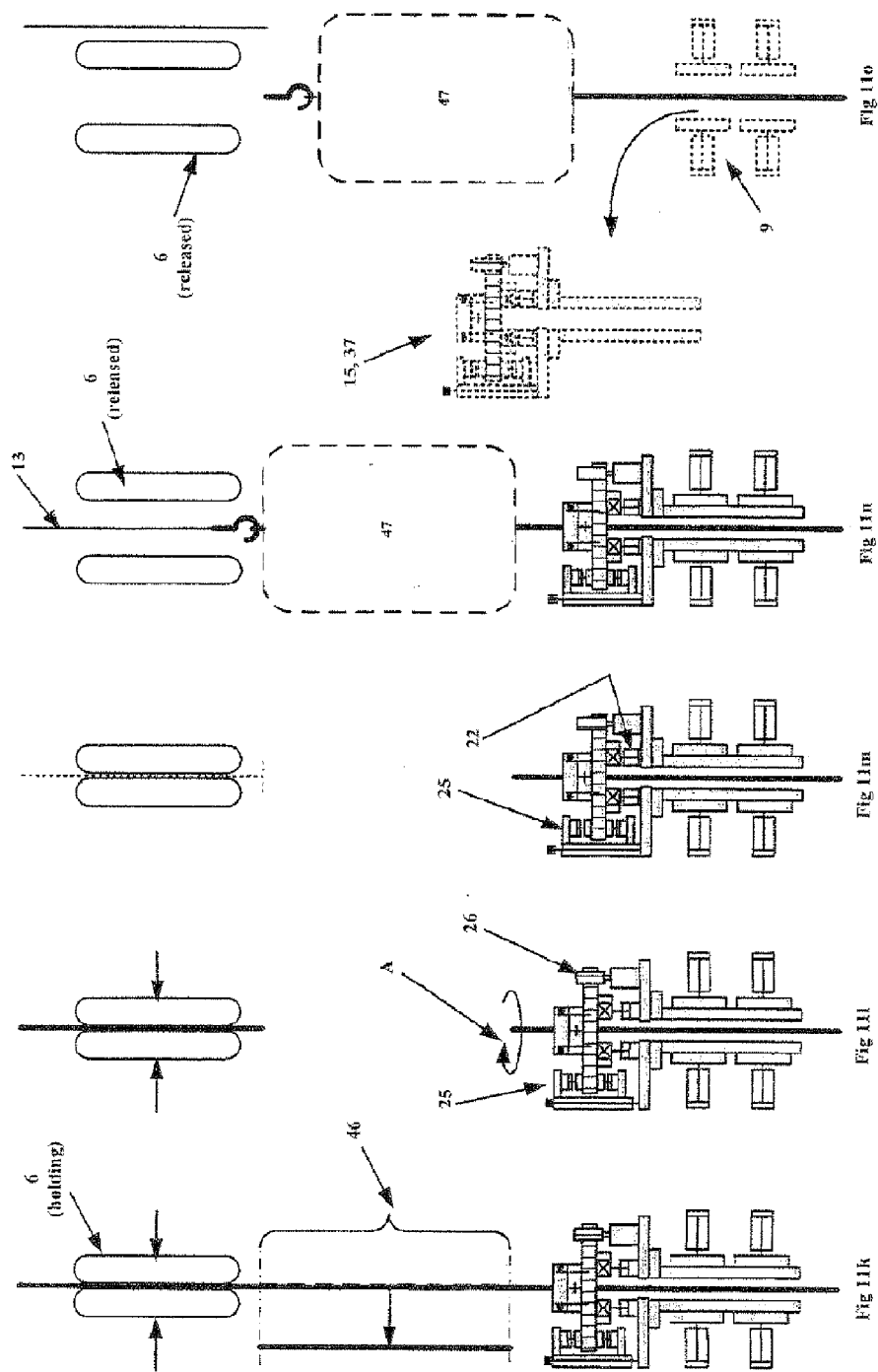

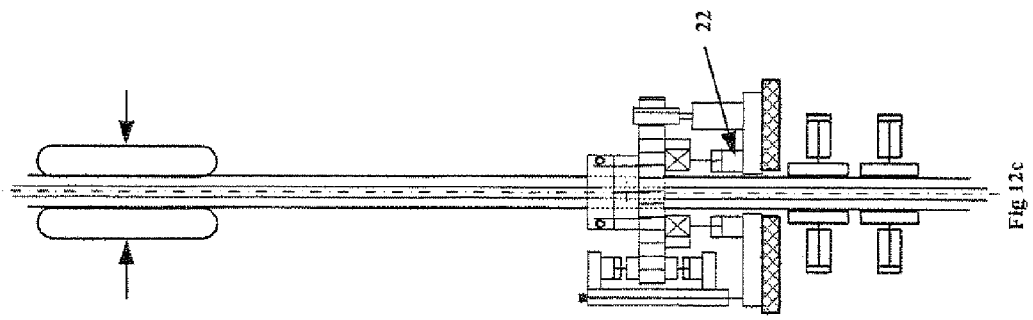
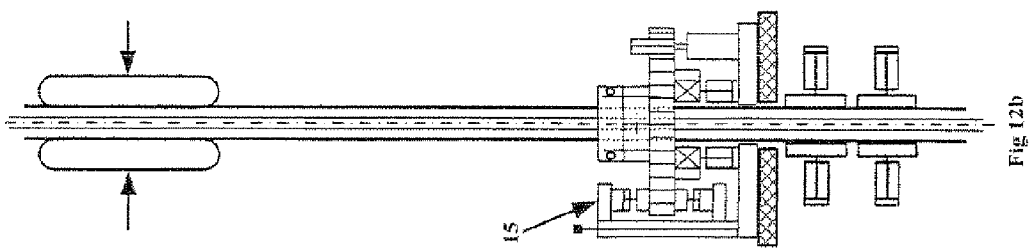
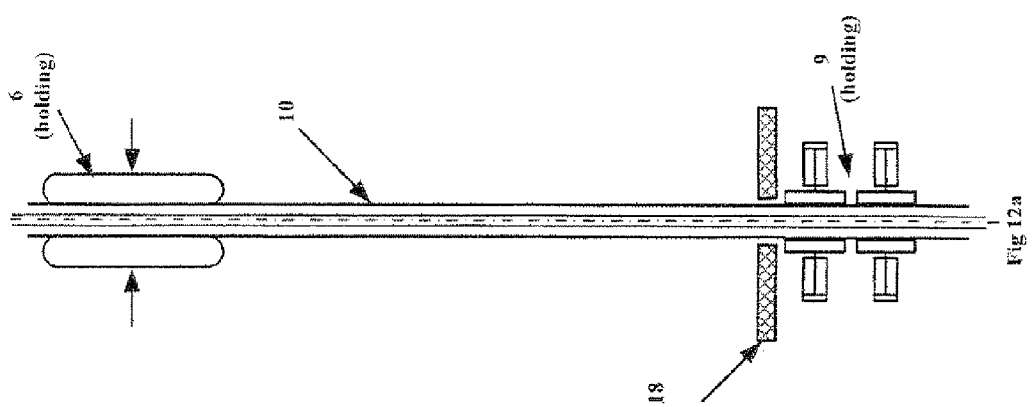

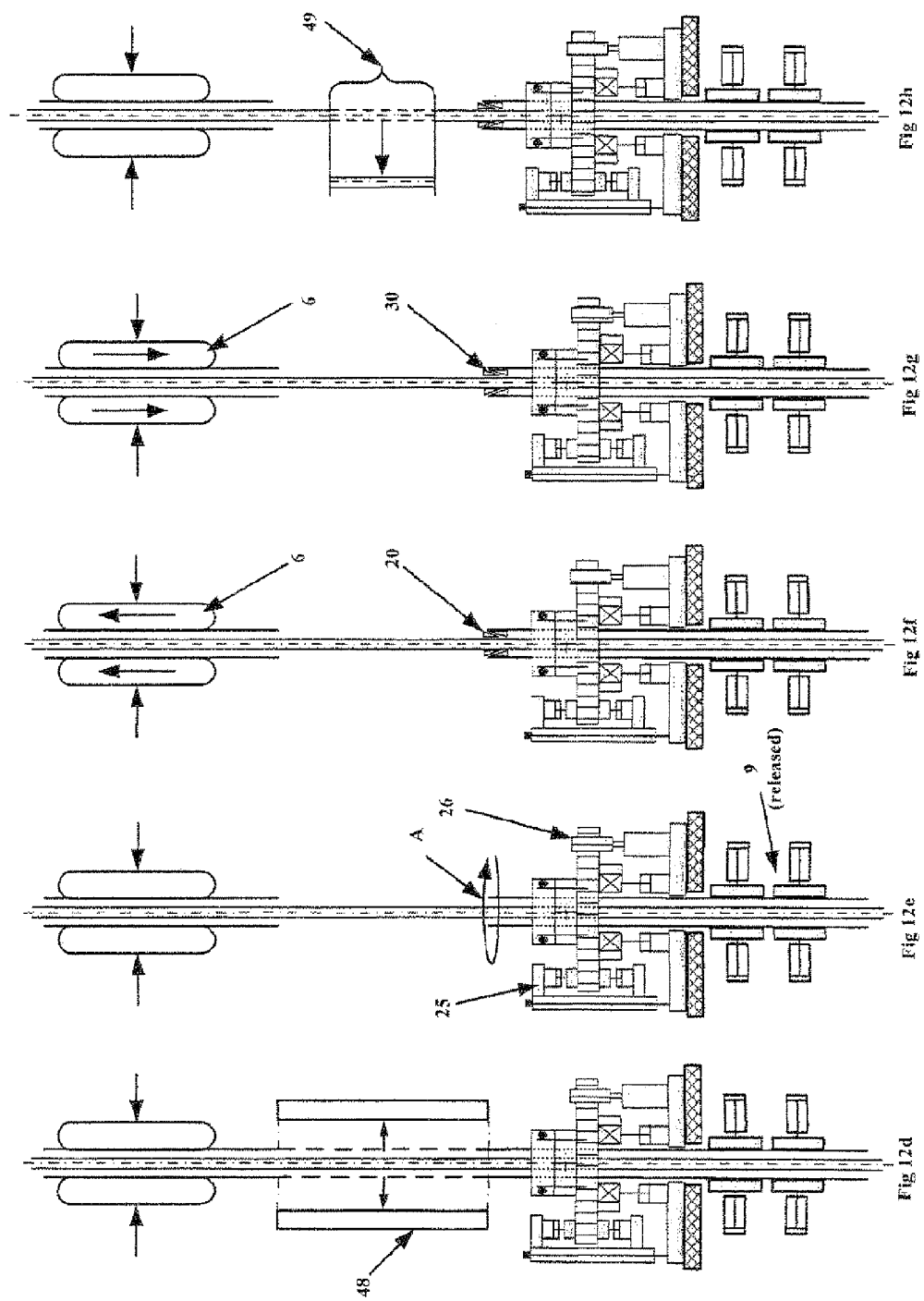

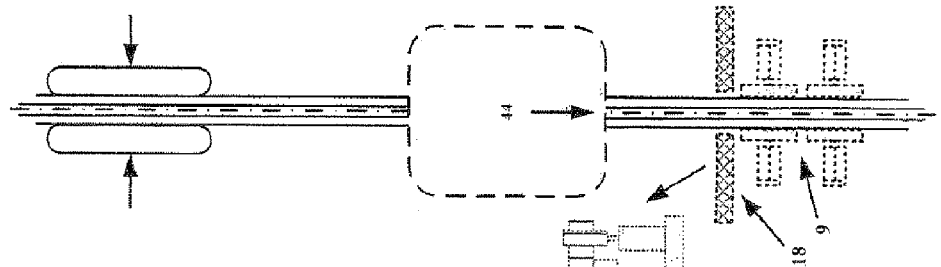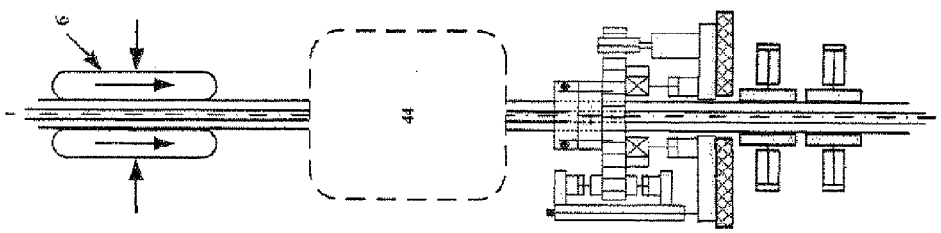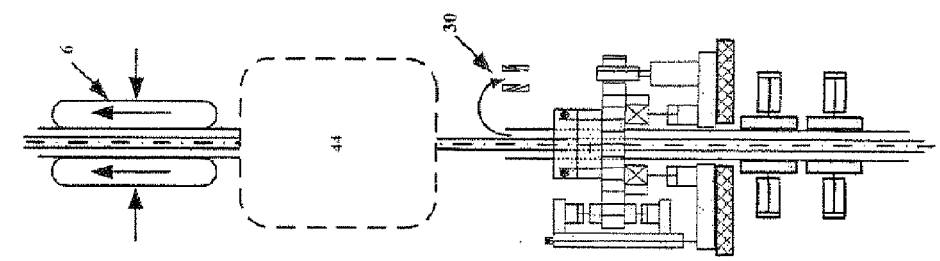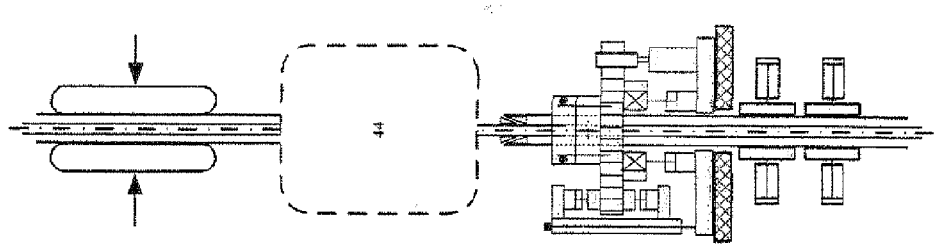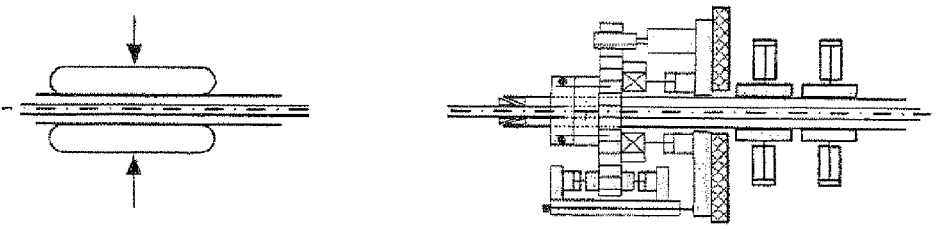

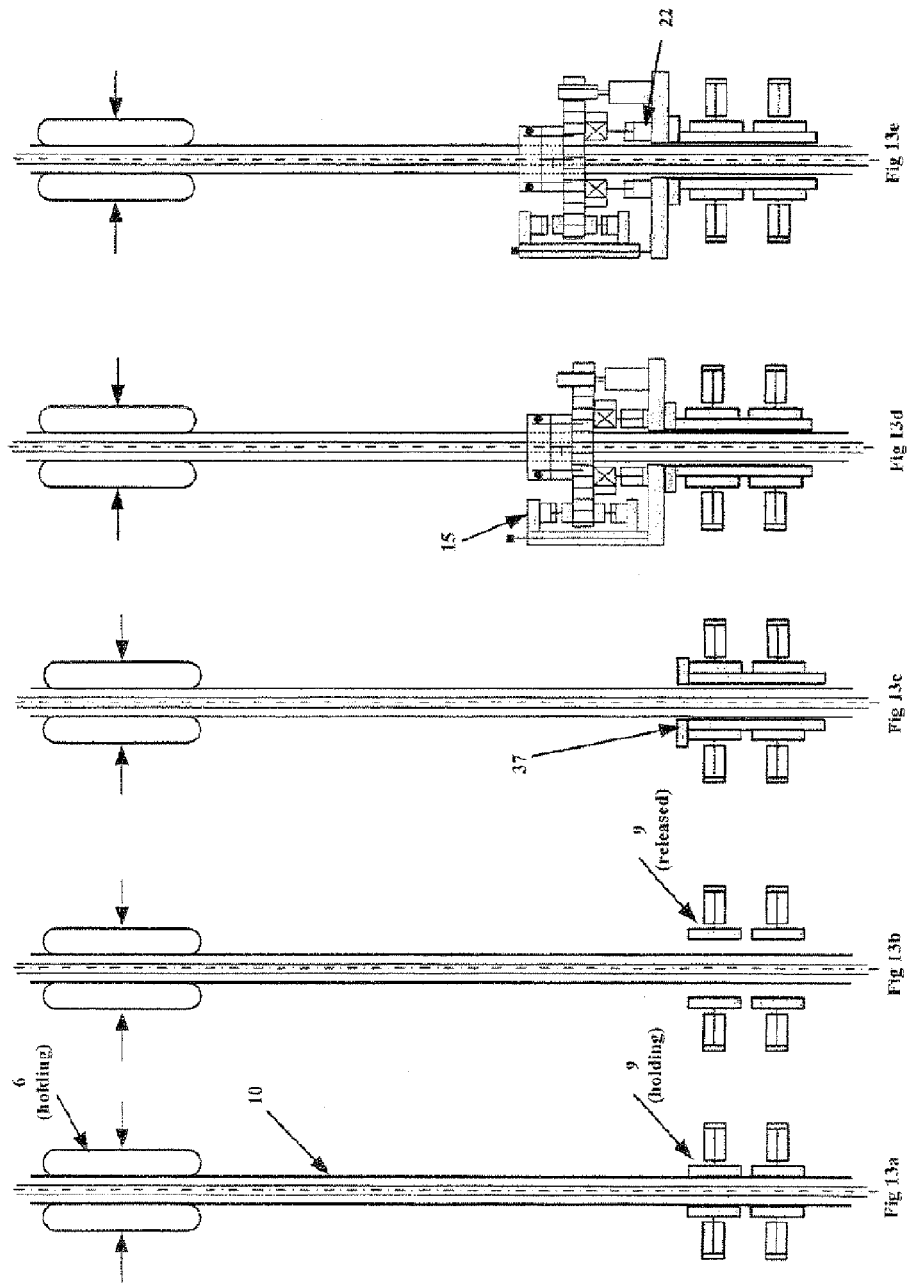

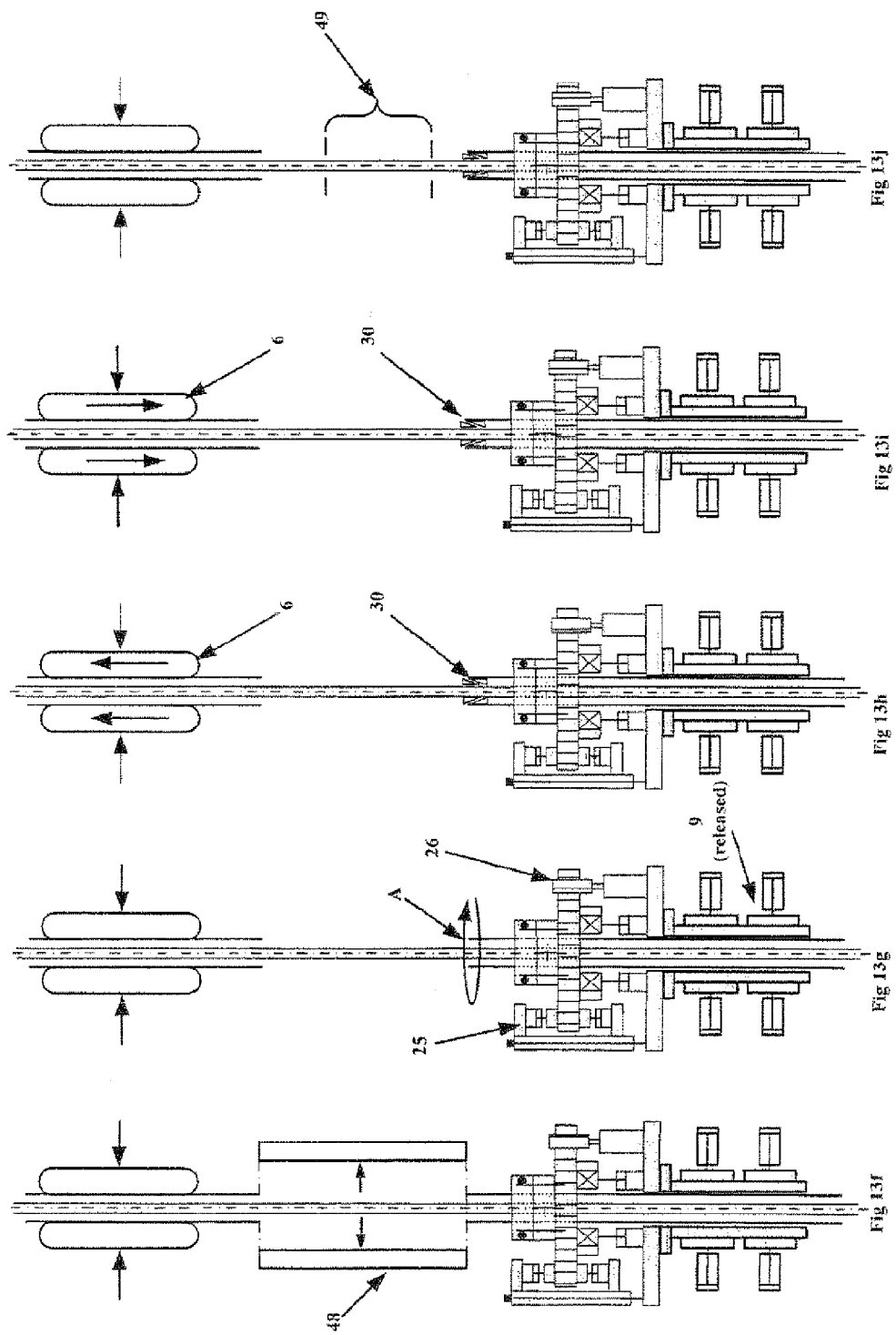

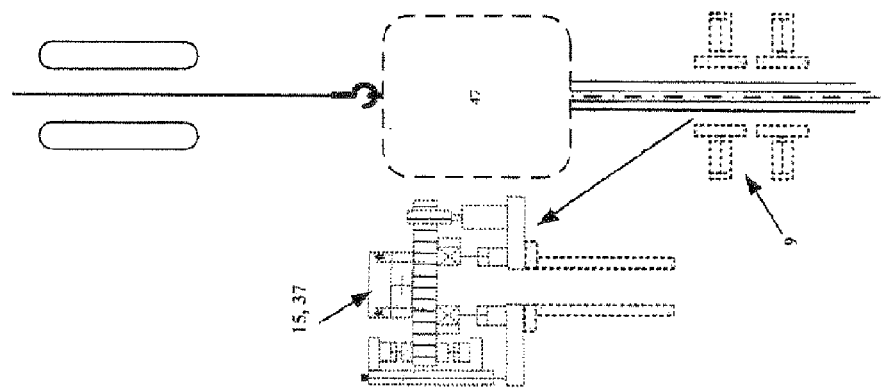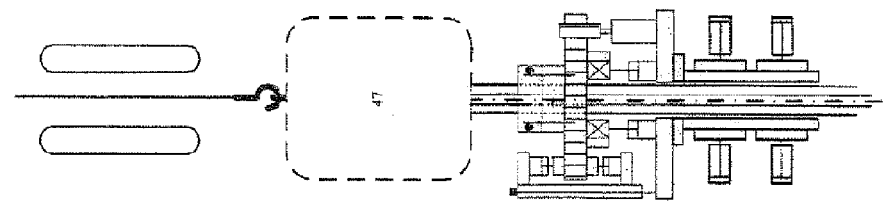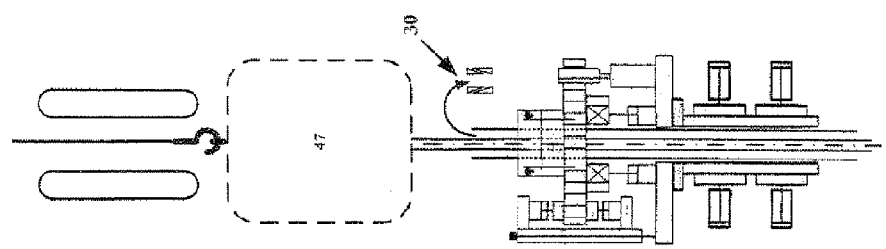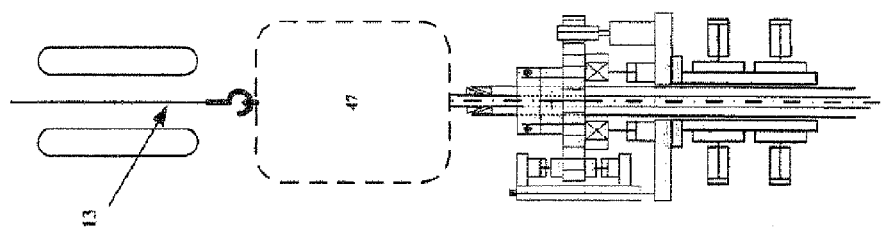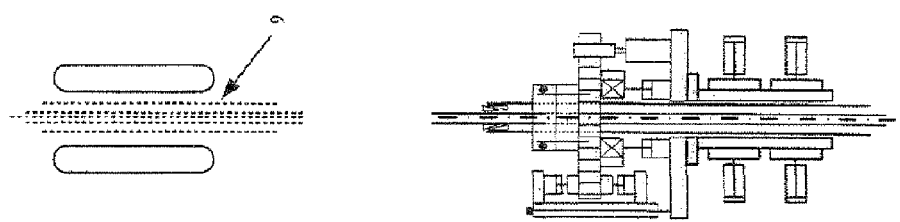

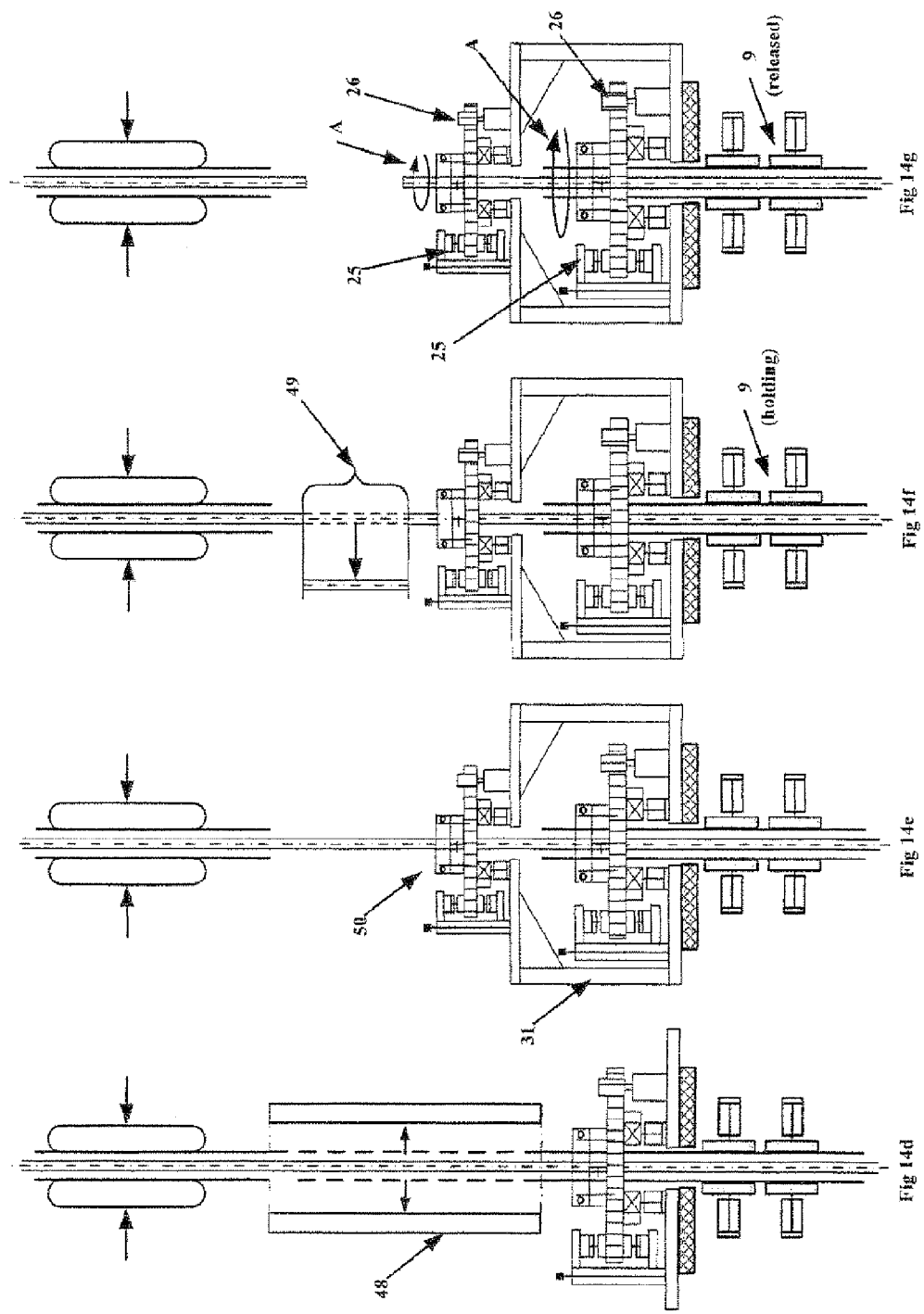

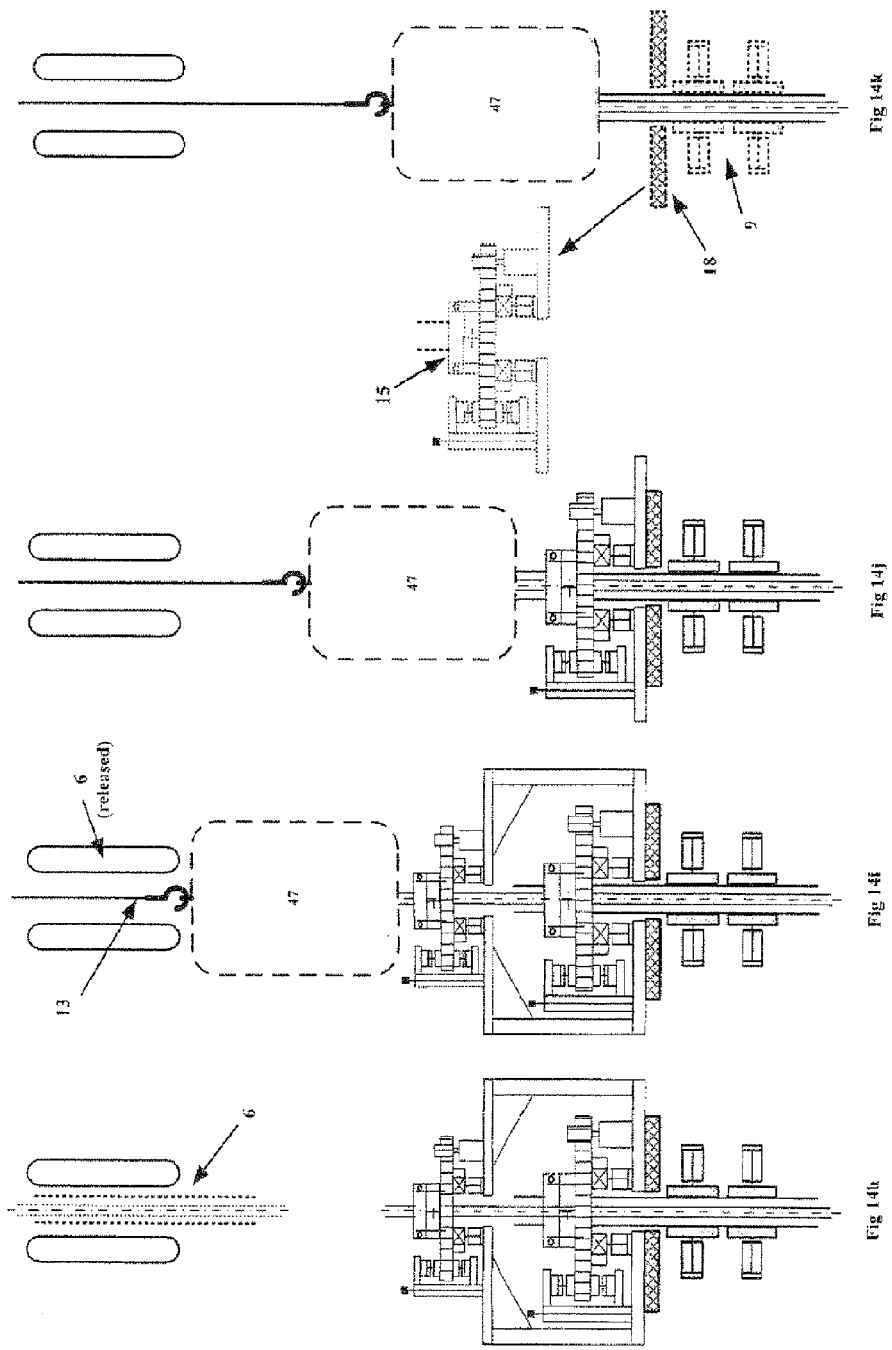

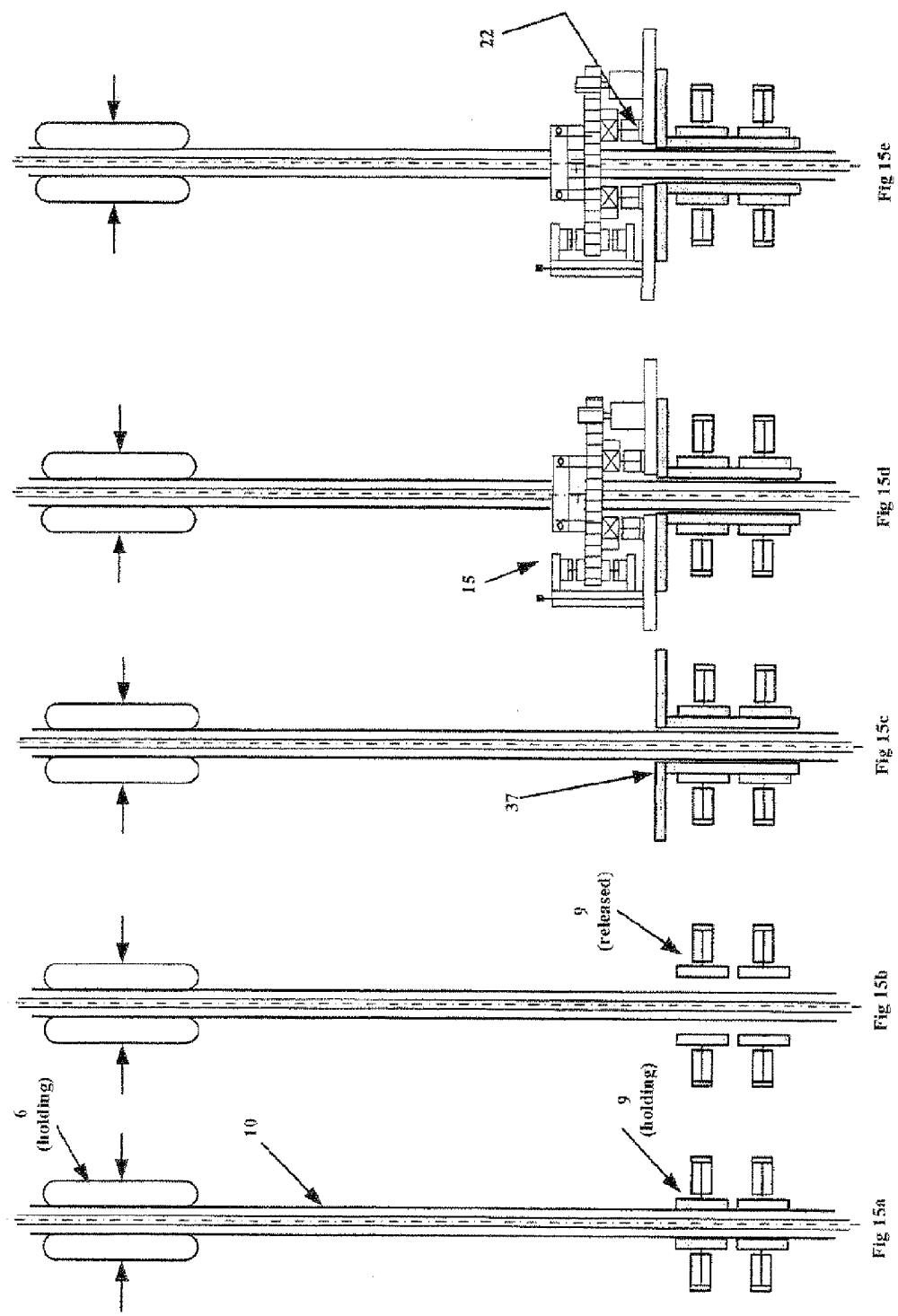

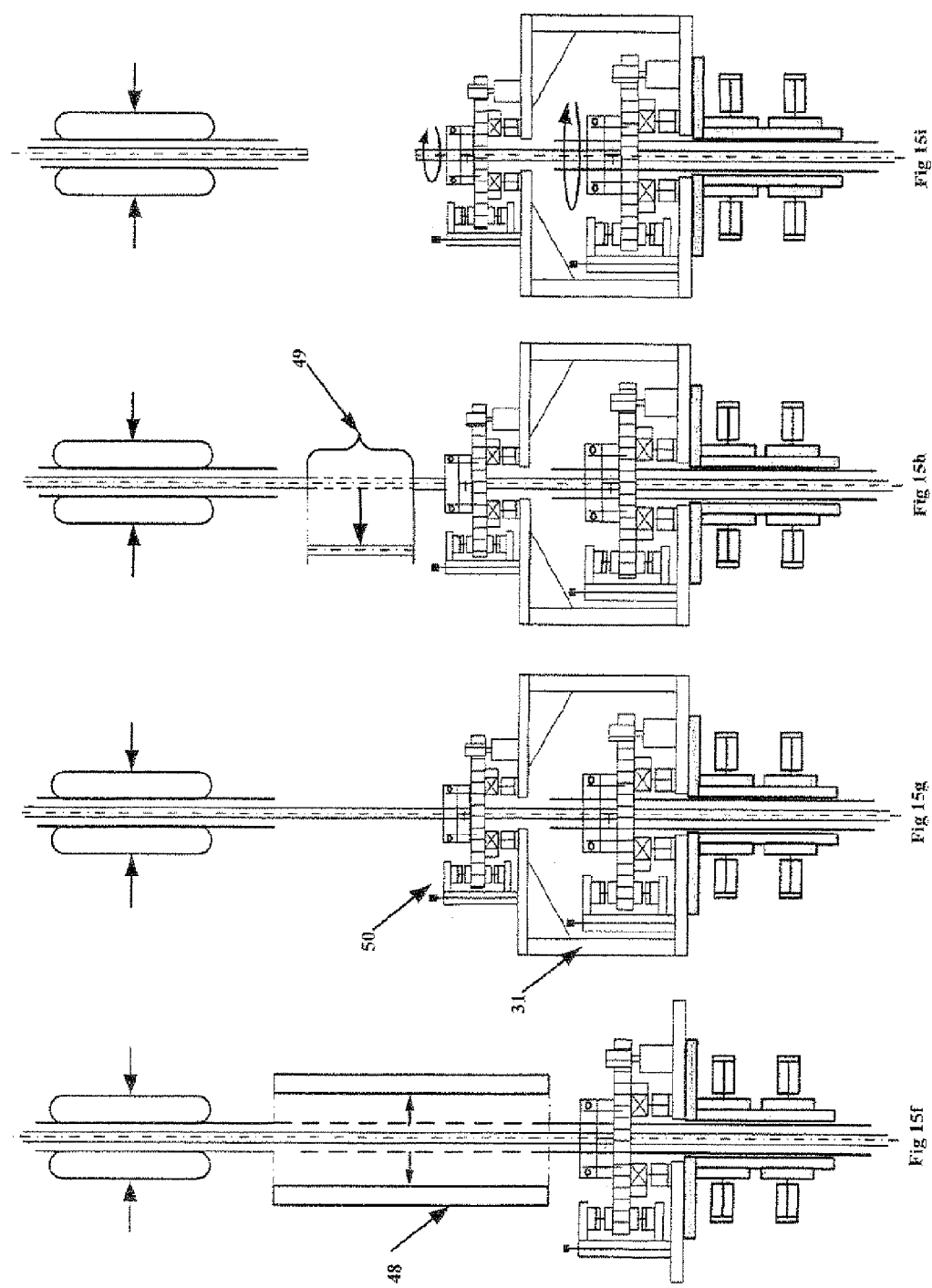

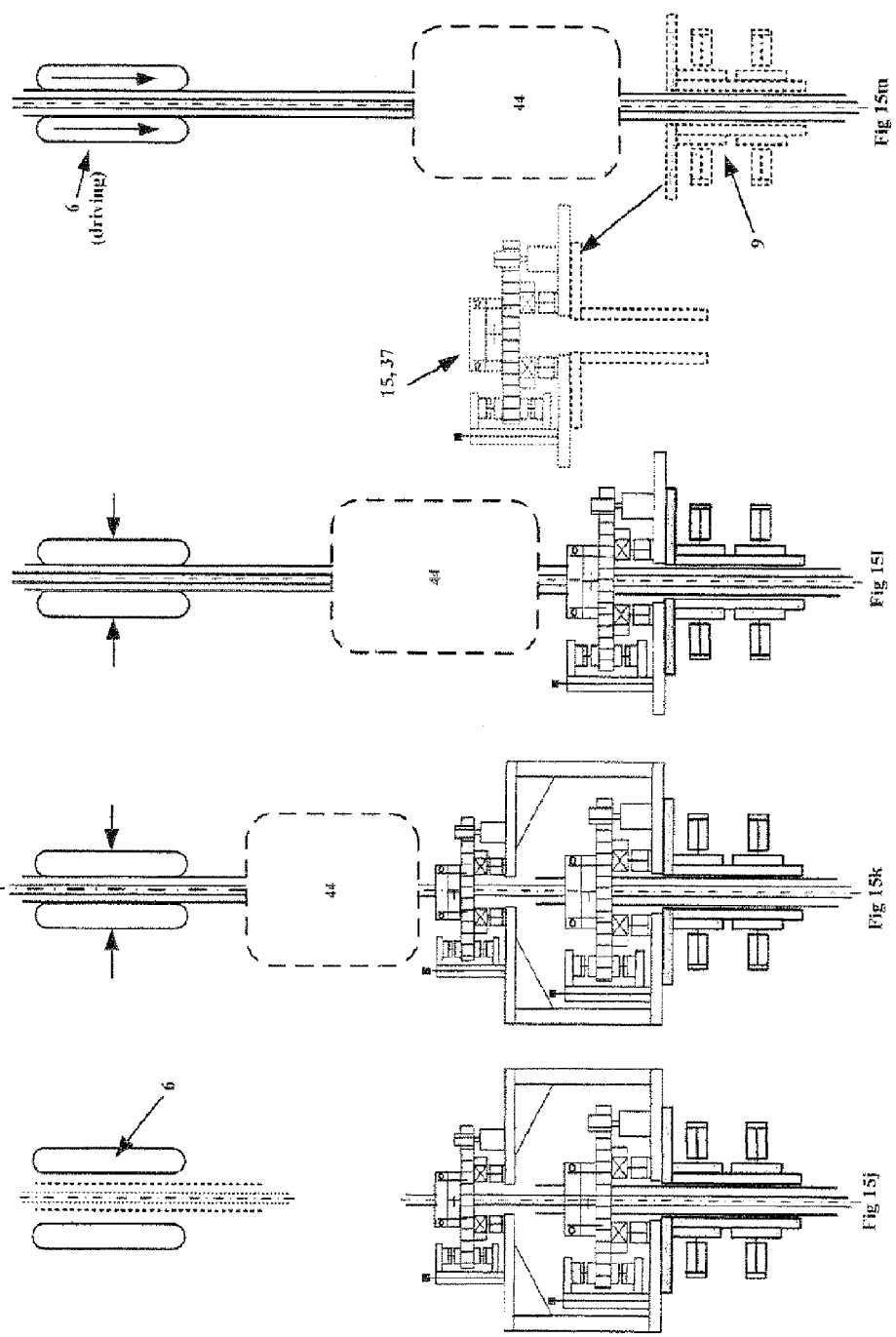

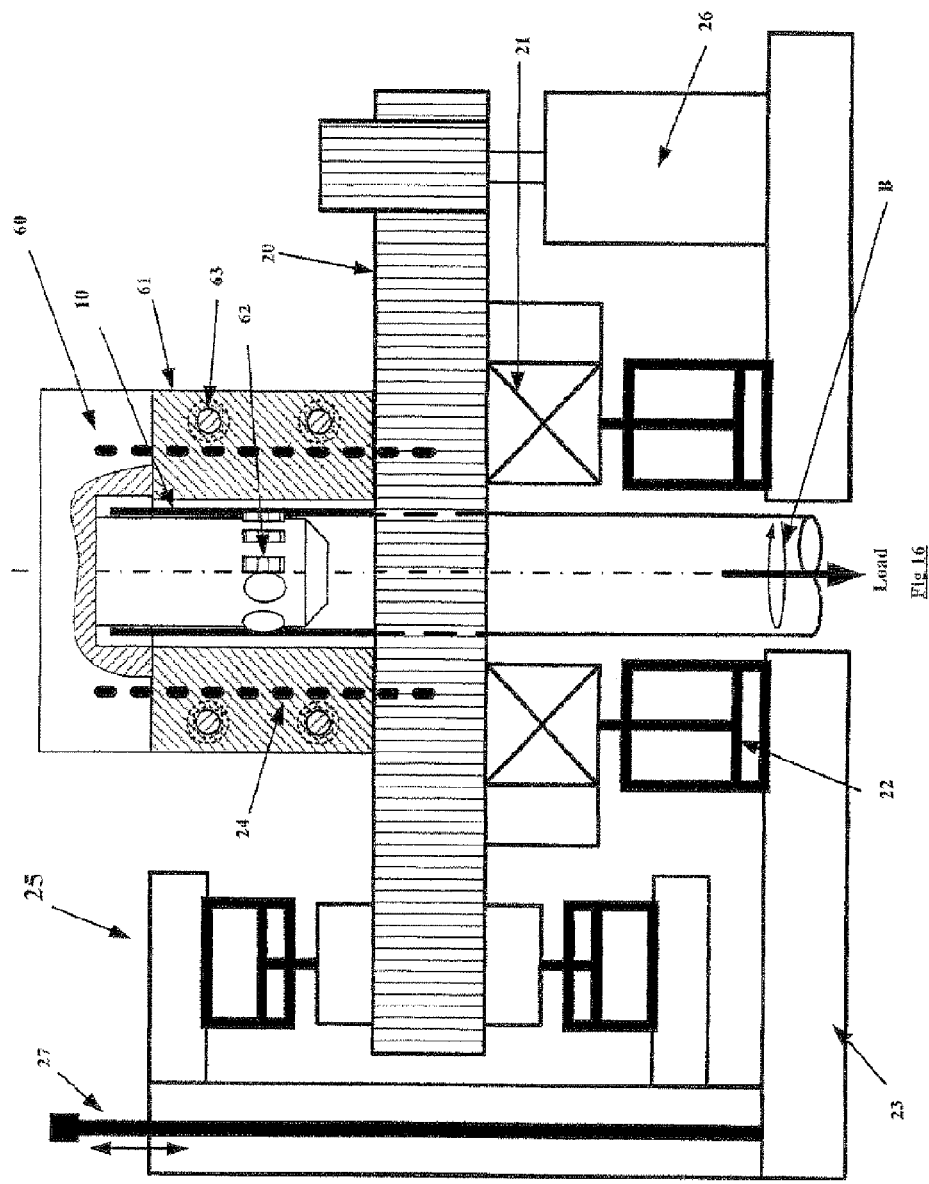

APPARATUS AND METHOD FOR USE IN LAYING PIPE ON THE SEA FLOOR

CROSS REFERENCE

This application was filed as Patent Cooperation Treaty Application Number PCT/EP2009/056793 on Jun. 3, 2009, which claims priority to Great Britain Application number 0810201.4 filed Jun. 4, 2008, both of which are incorporated herein by reference.

BACKGROUND

This invention relates to a method and apparatus for laying pipe from a floating pipelay vessel onto the sea floor.

In laying pipe from a pipelay vessel it is well known that the pipe is subject to torsion and that this induces a residual un-relieved torque in the pipe. This needs to be released before undertaking a pipe joining operation, and/or the attachment of in-line and/or end modules etc. This is particularly the case for the modules, which are launched with a preferred orientation relative to the sea floor, and any residual torque in the pipe can adversely affect their alignment for the final lay down process on the sea floor

SUMMARY

As illustrated in FIG. 1, a prior art includes a pipe storage reel 1, mounted on a pipelay vessel 2, on which is wound pipe 10 which is guided into the sea along a pipelay structure such as a pipelay ramp 3. On the pipelay ramp 3 is mounted a curved guide 4, a straightener 5, a tensioner 6, a. workstation 7 and a hold off clamp (HOC) 9.

The pipe 10 is led from the reel 1 over the curved guide 4 and down the pipelay ramp 3 along a lay path. In doing so it passed through straightener 5 that takes out the residual bend arising from storage on the reel 1, and then through the tensioner 6 that supports the suspended pipe 10a disposed in the sea, and controls the rate at which the pipe is paid out during the lay process. The pipe 10 passes through the workstation 7 where pipe joining operations are carried out and thence to the HOC 9, that can hold the pipe suspended between itself and the sea floor. This is required when the pipe has to be cut between the tensioner 6 and the HOC 9, for example for the insertion of pipeline modules, the attachment of a "new" pipe etc.

Currently the problem of releasing the residual un-relieved torque in the pipe is addressed by using an Abandonment and Recovery (A&R) winch 11 to support the weight of the pipe IGa, whilst the residual torque is relieved by a swivel incorporated into the A&R winch line, or by allowing the residual torque to transfer into the A&R winch line.

This prior art process involves a sequence of steps which will now be described with reference to FIGS. 2a to 2h.

The pipe 10 is laid in the normal way down the pipelay ramp 3 and the pipe is gripped by the HOC 9, as illustrated schematically in FIG. 2a. As is apparent the HOC 9 in FIG. 2a is in the gripping position. The HOC 9 is disposed at the bottom end of the ramp approximately at the level of the deck 2a of the vessel 2. The load of the supported pipe may be from less than 100 tonnes to several hundred tonnes and is typically of the order of 300 tonnes.

With the pipe thus gripped, it is cut above the HOC 9, and the upper part 10b lifted clear using the tensioner and/or the pipe storage reel, as indicated schematically by the dashed section 10b, as illustrated in FIG. 2b.

An A&R winch connection head 12 is welded to the pipe end held in the HOC 9, as illustrated in FIG. 2c. This weld has to be qualified, that is, carefully made and tested (non-destructive testing only), to take the full load of the pipe suspended below the HOC 9. This is illustrated in FIG. 2c.

The A&R winch wire 13 is rigged on the ramp, and possibly fitted with a high capacity swivel 14, and then connected to the A&R head 12 on the pipe 10, as illustrated in FIG. 2d.

The A&R winch wire 13 is pre-tensioned no take the pipe load and the HOC 9 is released {opened). The pipe 10 is then free to untwist itself by rotating the A&R wire 13/swivel 14 as indicated by arrow A in FIG. 2e, which particularly shows the HOC 9 in the released position, as opposed to the gripping position illustrated in FIGS. 2a to 2d.

Once the pipe has untwisted, the HOC 9 is activated to grip the pipe 10 again, as illustrated in FIG. 2f, The winch wire and the swivel are removed, and the A&R connection head 12 also removed, all as indicated by the dashed lines in FIG. 2g. After this processing the situation illustrated in FIG. 2h is achieved, and subsequent tasks such as pipe joining and the installation of mid/end line modules etc. can be executed.

The overall process described above with reference to FIGS. 2a to 2h is very time-consuming and can take of the order of 12 hours, and may have to be done several times in a pipelay project. This adds considerably to the cost for the use of the pipelay vessel 2 on a given contract.

It should be noted that: it is crucial that the welding of the A&R head 12 to the pipe end is carefully executed and tested, as failure of the welding can lead to a catastrophic loss of the pipe string below the HOC 9. Since there is no means of applying a physical load to the weld, testing in this case is limited to only non-destructive testing (NDT).

Whilst the use of a swivel 14 has been described, the swivel 14 can be omitted and the residual twist (torque) in the pipe taken out along the length of the A&R wire 13 alone.

The present invention is particularly concerned with overcoming the shortcomings of the prior method described above, in particularly avoiding the need to rig and use the A&R winch system 11, and thus to decrease the timescales involved.

According to one aspect of the present invention there is provided an apparatus adapted to achieve controlled relative rotation between a pipe, being laid on the sea floor from a floating pipelay vessel, and the pipelay vessel, the apparatus comprising: securing means, for disposal on the pipelay vessel, adapted to be secured to the pipe at a position along a lay path of a pipelay structure of the pipelay vessel, said position being taken by the pipe during laying from the pipelay vessel, when said relative rotation is required, said securing means being adapted to support the weight of the laid pipe; and mounting means for said securing means adapted to provide controlled relative rotation of the securing means with respect to the pipelay vessel.

The securing means may be a clamping means adapted to be clamped around the circumference of the pipe.

The apparatus may further comprise a vessel support structure adapted for supporting the securing means and the mounting means and for deployment of the securing means and the mounting means on the pipelay vessel into the vicinity of the lay pa-h from a stowed position.

In the case where the pipelay vessel includes a hold off clamp mounted to the pipelay structure, which may comprise a pipelay ramp, the apparatus may further comprise a support structure for the securing means and the mounting means adapted to be gripped by the hold off clamp.

The mounting means adapted to provide said controllable relative rotation may comprise a brake assembly capable of preventing said relative rotation and drive means capable of providing predetermined rotation and torsional damping.

The securing means may be secured to a turntable of the mounting means and supported for rotation on a framework of the mounting means via a thrust bearing of the mounting means, and the turntable may comprise a brake disc for the brake assembly, which also comprises disc pads co-operable with the brake disc and brake actuation means, and the drive means may comprise a drive motor/torsional damping unit mounted on the framework and engageable with the turntable for said rotation/damping.

The securing means may be secured to a turntable of the mounting means and supported for rotation on a framework of the mounting means via a thrust bearing and pipe-tensioning cylinders of the mounting means, the pipe-tensioning cylinders being adapted to preload the thrust bearing to the weight of the pipe before the securing means alone is required to support the weight of the pipe during use of the apparatus. As a result the load carrying capacity of the securing means can be physically tested before they become the sole means of supporting the weight of the pipe suspended between the vessel and the sea bed, that is before the pipe is irretrievably cut above the hold off clamp.

In connection with an operation, requiring connection to and alignment of the pipe with another member during a pipelay operation, in which following securing of the securing means to the pipe a section of the pipe above the securing means is removed and the another member disposed for connection to the pipe held in the securing means, the drive means may be adapted to rotationally align faces of the pipe and the another member for said connection.

The pipe-tensioning cylinders may be adapted to provide axial movement of the secured pipe for alignment of the faces to be joined.

In connection with a pipe-in-pipe construction of pipe having an inner pipe and an outer pipe and wherein the pipe which is secured comprises the outer pipe, the apparatus may further comprise slip wedges for disposal between the inner pipe and the outer pipe upon removal of the outer pipe above the securing means, and before the inner pipe is cut, in order to lock the inner pipe to the outer pipe.

Alternatively, in connection with a pipe-in-pipe construction having an inner pipe and an outer pipe, there may be a first said securing means for securing the outer pipe and a second said securing means for securing the inner pipe after the outer pipe is removed above the first securing means, with said first securing means adapted to support the weight of the pipe-in-pipe construction, and the second securing means adapted to support the weight of the inner pipe, and each of the first and second securing means may have a respective mounting means adapted to provide a respective controllable relative rotation of the inner and outer pipes with respect to the pipelay vessel.

The securing means may be clamping means clamping to the external circumference of the pipe as described above, or alternatively an internal pipe gripping assembly, or a flange retainer structure including a flange welded to an end of the pipe.

According to a further aspect of the present invention there is provided a method for use in connection with the laying of pipe on the sea floor from a floating pipelay vessel, comprising the steps of: mounting a securing means to the pipelay vessel via mounting means adapted to provide controlled relative rotation of the securing means with respect to the pipelay vessel, the mounted securing means being adapted to support the weight of the pipe; securing the pipe in the securing means; and performing controlled relative rotation of the securing means with respect to the pipelay vessel. The controlled rotation may be performed in order to relieve residual torsion in the pipe. The controlled rotation may alternatively be performed in order to align the pipe with another member to be joined thereto.

The securing means may be such as to clamp the pipe around its outer circumference, or such as to grip the inner circumference of the pipe, or may comprise a flange retainer structure including a flange welded to an end of the pipe.

The method may further include the step of supporting the securing means and the mounting means on a vessel support structure adapted for deployment of the securing means and the mounting means into the vicinity of the pipe from a stowed position.

Alternatively the method may further include the step of supporting the securing means and the mounting means on a support structure gripped by a hold off clamp of a pipelay structure of the pipelay vessel.

The mounting means may comprise a brake assembly capable of preventing said relative rotation and drive means capable of providing predetermined rotation and torsional damping, and the method may include the steps of releasing the brake assembly to permit said relative rotation and using the drive means to provide damping of the relative rotation or to achieve a predetermined relative rotation.

The securing means may be secured to a turntable of the mounting means and supported for rotation on a framework of the mounting means via a thrust bearing and pipe-tensioning cylinders of the mounting means, and the method may include the step of preloading the thrust bearing to the weight of the pipe before the clamping means alone is required to support the weight of the pipe. This physically tests the load carrying capacity of the clamping means (bear clamps) before they become the sole means of supporting the weight of the pipe suspended between the vessel and the seabed, that is before the pipe is irretrievably cut above the HOC.

The method may further include the step of adjusting the pipe tensioning cylinders to provide axial movement of the secured pipe.

In the case of a pipe-in-pipe construction of pipe having an inner pipe and an outer pipe, the securing means may be secured to the outer pipe and the method may include steps of removing the outer pipe from above the securing means, and inserting slip wedges between the inner and outer pipes prior to cutting of the inner pipe from above the securing means, whereby to lock the inner pipe to the outer pipe.

Alternatively, in the case of a pipe-in-pipe construction of pipe having an inner pipe and an outer pipe, a first said securing means may be employed for securing the outer pipe and a second said securing means may be employed for securing the inner pipe, and the method may include the steps of: securing the outer pipe with the first securing means; removing the outer pipe from above the first securing means; securing the inner pipe with the second securing means; and performing respective controlled relative rotation of the inner and outer pipes.

BRIEF DESCRIPTION OF THE DRAWINGS

For a better understanding of the invention and to show how the same may be carried into effect, reference will now be made, by way of example, to the accompanying drawings, in which:

FIGS. 2a to 2h show successive stages in a prior art process for relieving torque in a pipe;

FIG. 3 shows a schematic pipelay system with which the present invention is employed;

FIG. 4 shows schematically the structure of an apparatus (twister) adapted to achieve controlled relative rotation between a pipe and a pipelay vessel, particularly but not exclusively for relieving torque in the pipe, for use in connection with a single pipe, and FIG. 4a shows bear grips for clamping the pipe in a sectional and a side view;

FIG. 5 shows a variant of the apparatus (twister) of FIG. 4 and which is particularly applicable to a pipe-in-pipe embodiment of pipe to be laid, this embodiment employing slip wedge elements particularly illustrated in FIG. 5a;

FIG. 8a shows schematically and partially in section a so-called Top Hat device for use in combination with the twister instead of the vessel support structure of FIGS. 7a and 7b, FIG. 8b shows a view taken along the line A-A of FIG. 8a;

FIGS. 10a to 10m show various steps in the use of a single pipe twister in combination with a vessel support structure, and for the attachment of pipeline end terminations or midline units;

FIGS. 11a to 11o show the various steps in the use of a twister and a Top Hat. device installed in a hold off clamp, for both the installation of mid-line units and pipeline end terminations;

FIGS. 12a to 12m show the various steps in connection with a pipe-in-pipe construction for the pipe and using the vessel support structure and slip wedge elements, particularly in connection with the introduction of a mid-line unit;

FIGS. 13a to 13o show various steps in the use of a single twister with slip wedge elements on a Top Hat device for a pipe-in-pipe construction, and particularly in connection with the installation of a pipeline end termination;

FIGS. 14a to 14k show various steps in the use of a twin twister arrangement installed on a vessel support structure, and in connection with a pipeline end termination;

FIGS. 15a to 15m show various steps in connection with a twin twister using a Top Hat device, and particularly in connection with the use of a mid-line unit;

FIG. 16 shows an internal pipe gripping device for use in place of the bear grips of FIGS. 4 and 4a; and FIG. 17 shows a pipe securing means employing a flange retainer as an alternative to the bear grips of FIGS. 4 and 4a.

DETAILED DESCRIPTION

Figure 1:
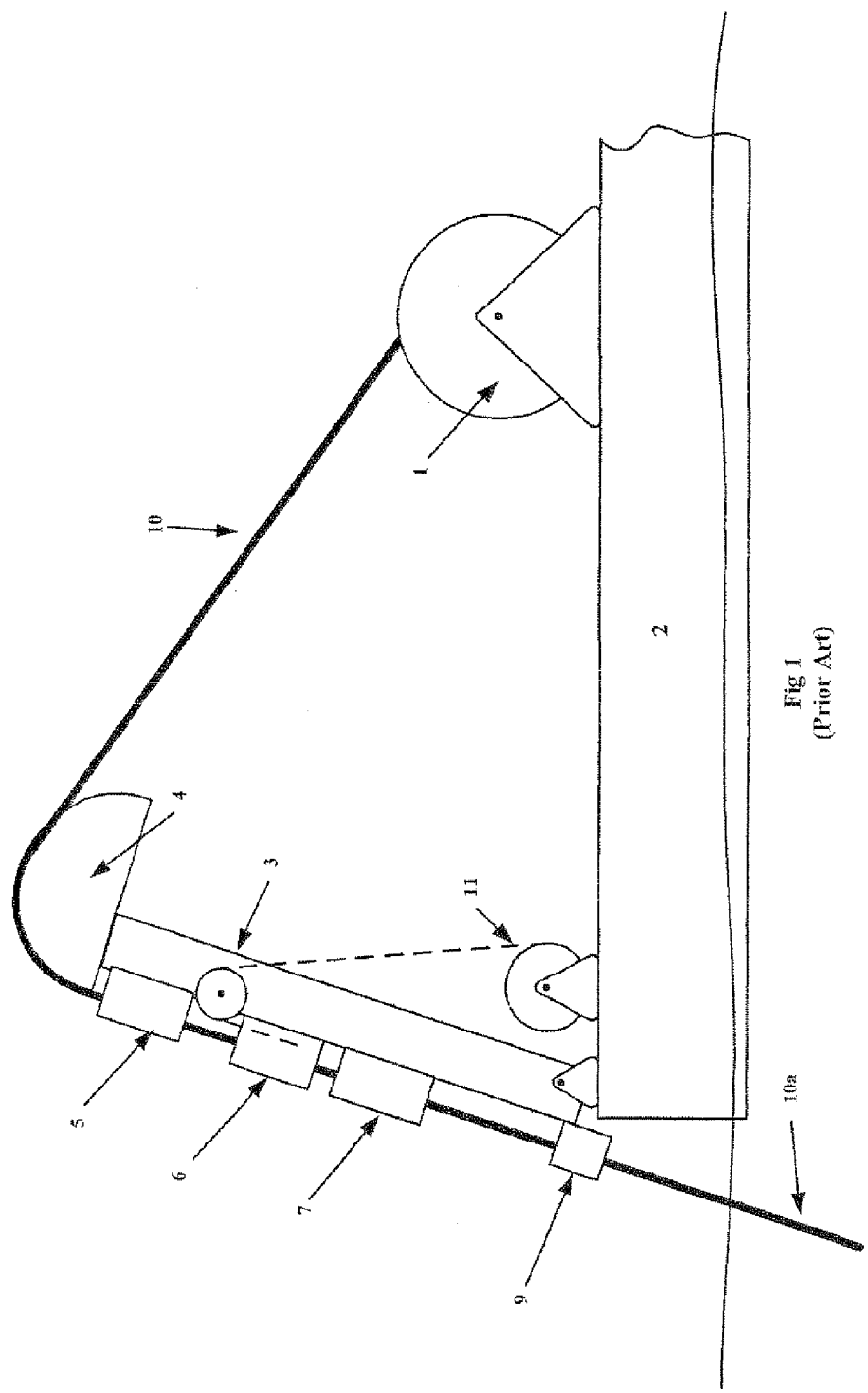
FIG. 1 is a schematic elevational view of a prior art pipe handling apparatus for laying a pipe on the sea floor.

Referring firstly to FIG. 3, in which there is shown a typical pipelay system in schematic form with which the present invention is concerned. On a floating pipelay vessel 2 is mounted a pipe storage reel 1 on which is wound either single pipe, or a pipe with a pipe-in-pipe construct ion, to be laid on the sea floor. The pipe or the pipe-in-pipe may be a rigid pipe of steel or an alloy or a composite. The pipe may optionally be a flexible pipe. The pipe 10 is laid over a pipelay structure, such as a pipelay ramp 3 in a conventional manner. The pipelay ramp 3 carries a curved guide 4, a straightener 5, a tensioner 6, a workstation 7 and a hold off clamp 9, all of which elements are conventional, and in addition employs a twister arrangement 8, namely an apparatus adapted to achieve controlled relative rotation between the pipe 10 and the pipelay vessel 2, and according to the particular variant employed, a vessel support structure 18 or other support means. The vessel also includes an A&R winch system 11, which is used for certain of the stages of the pipelaying process, as will be apparent from the following.

An embodiment of twister 8 of the present invention is shown schematically in FIGS. 4 and 4a which relates to an arrangement for a single pipe and is indicated by the general reference numeral 15.

The twister 15 comprises a pair of "bear grips" 19, constituting a. securing means, in particular a clamping means 19, which are disposed on the pipelay vessel 2 and clamped to the pipe 10, in particular clamped around the circumference of the pipe by means of fixing bolts 19a, with sufficient grip to retain the weight of the pipe suspended below them. The clamping means 19 are clamped to the pipe 10 at a position along a lay path of the pipe taken during laying from the vessel, the lay path being down the pipelaying structure such as the pipelay ramp 3. The clamping means 19 is such as to be able to support the weight of the pipe suspended between it and the sea floor (pipe load). These bear grips or clamping means 19 rest on a turntable 20 which is supported on a thrust bearing 21 rated to carry the pipe load. The thrust bearing 21 is" supported on pipe-tensioning cylinders 22 whose lower ends are fixed to a top surface of a framework 23 on which all of the twister components are mounted.

The turntable 20 is connected to the clamping means 19, and thence to the pipe 10, by drive pins 24, and is rotationally lockable by a brake assembly 25 for which it forms a brake disc. The rotation characteristics of the turntable during pipe torque release can be controlled by a torsional damper 26. Whilst a disc brake arrangement is particularly described, other brake types (non-disc) could be employed.

The turntable 20 also serves as a drive wheel which can be rotated by a drive motor incorporated in the torsional damping unit 26. This allows the pipe 10 to be twisted, thus facilitating, for instance, the alignment of pipe joint faces for welding.

The pipe-tensioning cylinders 22 below the thrust bearing 21 provide a means whereby the latter can be jacked up and thus pre-loaded to the pipe weight before the HOC 9 is opened, thus protecting the bearing 21 from shock loads. Additionally, by applying an initial overload to these pipe-tensioning cylinders 22, the grip of the clamping means 19 can be tested before the HOC 9 releases its grip and the pipe is cut between the twister and the tensioner.

During a pipe laying process the pipe 10 twists as indicated by the arrow B, corresponding to the torsion which needs to be relieved.

The actual pipe movement imparted by the pipe-tensioning cylinders 22 can also be used to facilitate limited axial joint face alignment: for welding.

It should be noted that the majority of the components of the twister apparatus will be in two inter-connecting halves, as the unit has to be installed around a continuous pipe.

Brake assembly guide rods 27 serve to allow the brake assembly 25 to move up and down (arrow 25a) with the pipe 10 and the turntable (disc) 20 as the axial load is applied/removed via the cylinders 22. The brake actuators 25b are simultaneously retained in the same position in azimuth relative to the disc, so that a braking force can be applied.

Various types of rotary drive means, torsional damping and braking can be used as will be appreciated by the person skilled in the art.

The elements of the twister arrangement illustrated in FIG. 4, other than the clamping means 19, comprise a mounting means for the clamping means adapted no provide controlled relative rotation of the clamping means with respect to the pipelay vessel and around the lay path, in particular the elements are the turntable 20, the thrust bearing 21, the framework 23, the brake assembly 25 and the drive means 26, which acts as a drive motor or a torsional damping unit.

The embodiment of FIG. 4 has been described in connection with a single pipe 10. However, in connection with a pipe-in-pipe construction comprising an inner pipe 28 and an outer pipe 29 a variant is required such as illustrated in FIG. 5, which shows a twister for a pipe-in-pipe construction which employs slip wedge elements, indicated in general by reference numeral 16. FIG. 5a shows an enlarged section of the slip wedge elements 30 illustrated in FIG. 5. Other elements of the arrangement in FIG. 5 correspond to those in FIG. 4 and the same reference numerals have been employed.

When working with a pipe-in-pipe construction it is necessary to be able to fix the inner pipe 28 to the outer pipe 29, so that when the inner pipe is cut, it. is prevented from falling irretrievably down inside the outer pipe.

In general, it is considered that, unlike the outer pipe, inner pipe torsion very often does not manifest itself, due to friction with the outer pipe, so that independent torsion release is less necessary, with the result that in this case, once the torque has been released from the outer pipe, the two pipes can be locked together using a pair of slip wedge elements 30, As indicated in FIG. 5a, as the inner pipe 28 moves down, the wedge action of the slip wedge elements 30 locks the inner pipe 28 to the outer pipe 29.

As is clear from FIGS. 5 and 5a the slip wedge elements 30 comprise pairs of wedges which are fitted face to face in the annulus between the inner and outer pipes. Their sloping faces are angled such chat the tendency of the inner pipe to move downward under its own weight causes a wedging action that forces the two wedges apart, thereby increasing their grip on the two pipes. This grip is sized to prevent the inner pipe from sliding down inside the outer pipe. To release the slip wedge elements, the inner pipe is pulled upward relative to the outer pipe, so reversing the wedge effect, and this is referred to later in connection with particular embodiments.

Figure 6:
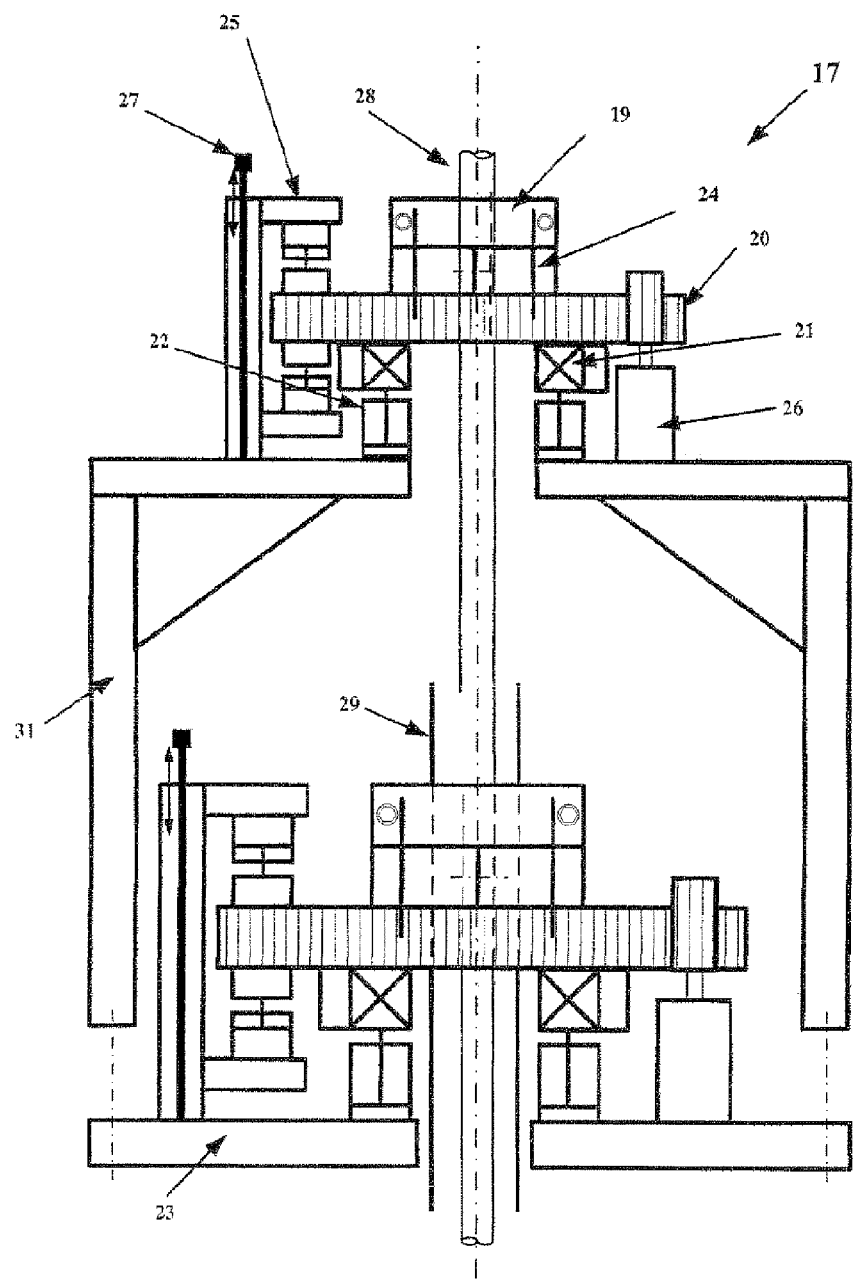
FIG. 6 illustrates schematically a twin twister arrangement for use with pipe-in-pipe configurations which uses an additional twister rather than the slip wedge elements of FIG. 5.

An alternative arrangement for use with a pipe-in-pipe construction is illustrated in FIG. 6 and this employs two twisters. Whereas as mentioned above, only the outer pipe may acquire a residual torsion, on occasion, and in particular as the pipelay moves into ever deeper waters, it may be found that the inner pipe has also acquired a residual torsion, and this may or may not match that of the inner pipe. It may be more, less or even of the opposite rotation.

In this case two twisters are required for torsion relief, one for the outer pipe and one for the inner pipe, as illustrated schematically in FIG. 6 and the overall arrangement is given the reference numeral 17.

The two twisters use basically identical components except that the top one uses smaller components to reflect the smaller inner pipe diameter.

The two twisters are joined by a frame 31 which positions the top unit at the required distance from the lower unit. This is because of the need to grip the inner pipe above the outer pipe. The frame 31 is removable, along with the top unit, so that after achieving the steps necessary to make a weld at the end of the inner pipe access is provided for welding to the outer pipe adjacent to the bottom unit/HOC 9. This is discussed in connect: ion with particular processes in the following.

It should be noted that the inner pipe can be lifted to facilitate a joining process by use of the pipe-tensioning cylinders 22, and thus the inner pipe can be pulled up inside the outer pipe to facilitate making a joint between a midline unit or pipeline end termination and the pipe-in-pipe. This is also further discussed in the following.

It is a common feature of all of the twister configurations that they have to be mounted on the pipelaying vessel in an appropriate manner.

The twister will carry the full weight of the suspended pipe 10a and so it will have to be supported in such a way that it can take this load. It also has to be removable so that it can be withdrawn from the lay path when large objects are to be incorporated in the pipeline, for example the mid-line units (MLUs) and pipeline end terminations (PLETs), and the like.

Figure 7:
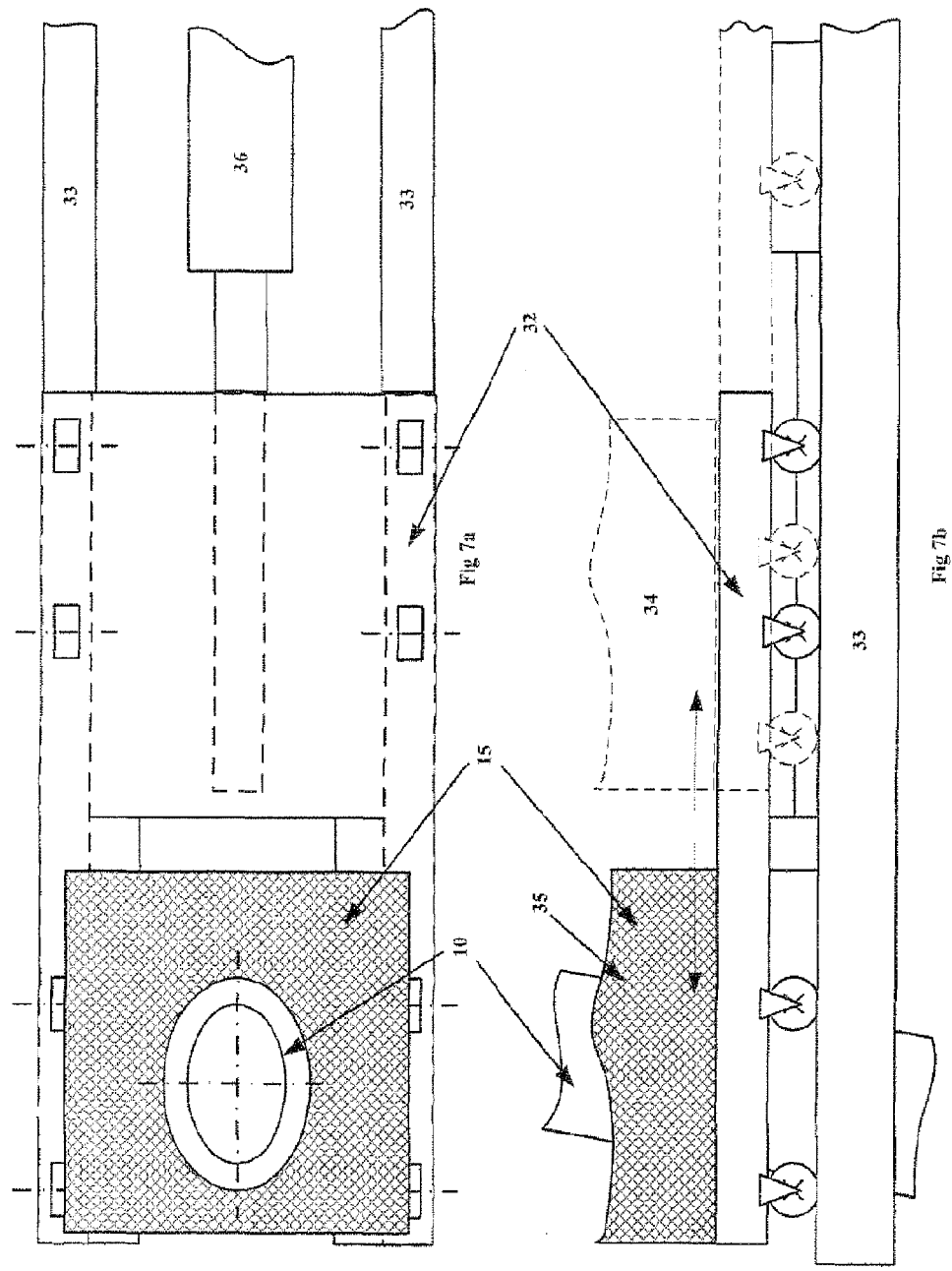
FIGS. 7a and 7b show respectively a plan view and a side view of a schematic arrangement comprising a vessel support structure which can be used for deployment/stowage of the twister.
Figure 8:
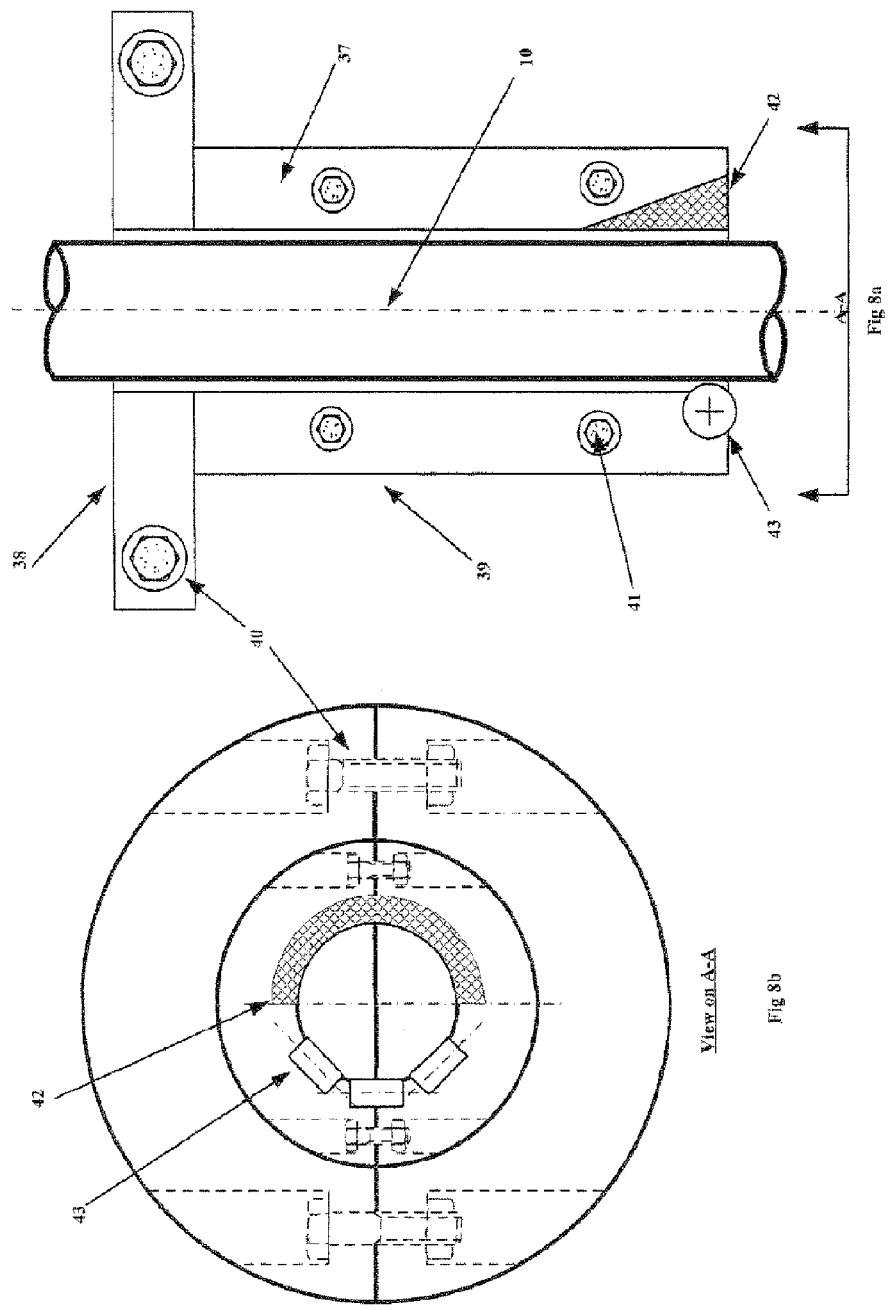

The support may be in the form of a vessel support structure (VSS), an example of which is that illustrated schematically in FIGS. 7a and 7b, or a Top Hat structure as illustrated schematically in FIGS. 8a and 8b.

A VSS can take a variety of forms to suit a given vessel, space constraints, pipe loads etc. It will provide a solid structure which can be extended past both sides of the pipe 10, in the manner of a forklift truck, or close around it. An upper face will be sized to accept the base of the twister, and the whole should be fully retractable to provide free passage down the lay path for MLUs, PLETs etc. It will need to be designed for the maximum pipe load with a suitable margin. Additionally, fore and aft adjustment of the VSS/twister combination will be necessary to cater for the illustrated arrangement where the pipe 10 is at an angle.

In the example of FIGS. 7a and 7b the VSS includes a trolley 32 adapted to run on rails 33 on the pipelay vessel 2 and carry a twister 15 between a stowed position 34 and a working position 35 relative to a pipe 10—A deployment mechanism 36 is shown schematically for moving the twister between the stowed position and the working position. Further description of the operation of the VSS will be apparent from the following.

Another support is the so-called Top Hat device illustrated in FIGS. 8a and 8b. The Top Hat device 37 comprises a cylindrical element with a flange element at one end. This is a two-part device that can be installed and gripped in the HOC 9. The bore of the Top Hat 37 cylindrical element is larger than the outer diameter of the pipe IO and so the latter is no longer gripped by the HOC 9, but is retained by other means, for example the tensioner 6 and the pipe storage reel 1. The Top Hat 37 provides, at its flange element, a landing surface 38 for the twister 15, and by its cylindrical element: a gripping surface 39 for the HOC 9. Since the Top Hat 37 is in the HOC 9 it is adequately supported for loads that will be imposed on it by the pipe suspended below. This is because the HOC 9 is specifically rated to take the pipe loads associated with a pipelaying operation. The Top Hat 37 can also provide other functions such as adapting the HOC 9 to accommodate special pipe end configurations, such as bend restrictors. The HOC 9 is itself designed to be removable to provide free passage down the lay path for MLUs and PLETs etc. However, the twister 15 and the Top Hat 37 will have to be removed from the HOC before it can be stowed. This is further described in the following.

As is apparent from FIGS. 8a and 8b the two parts of the Top Hat 37 are secured together by clamping bolts 40, 41, although optionally one clamping bolt 40 could be replaced by a hinge arrangement.

Also as indicated in FIGS. 8a and 8b, protection between the Top Hat 37 and the pipe is provided by a rubber/plastic insert 42 or pipe protection rollers 43. FIGS. 8a and 8b show both types of protection, as an example, whereas in practice either the insert or the rollers will be provided around the circumference of the bore through the Top Hat.

Figure 9:
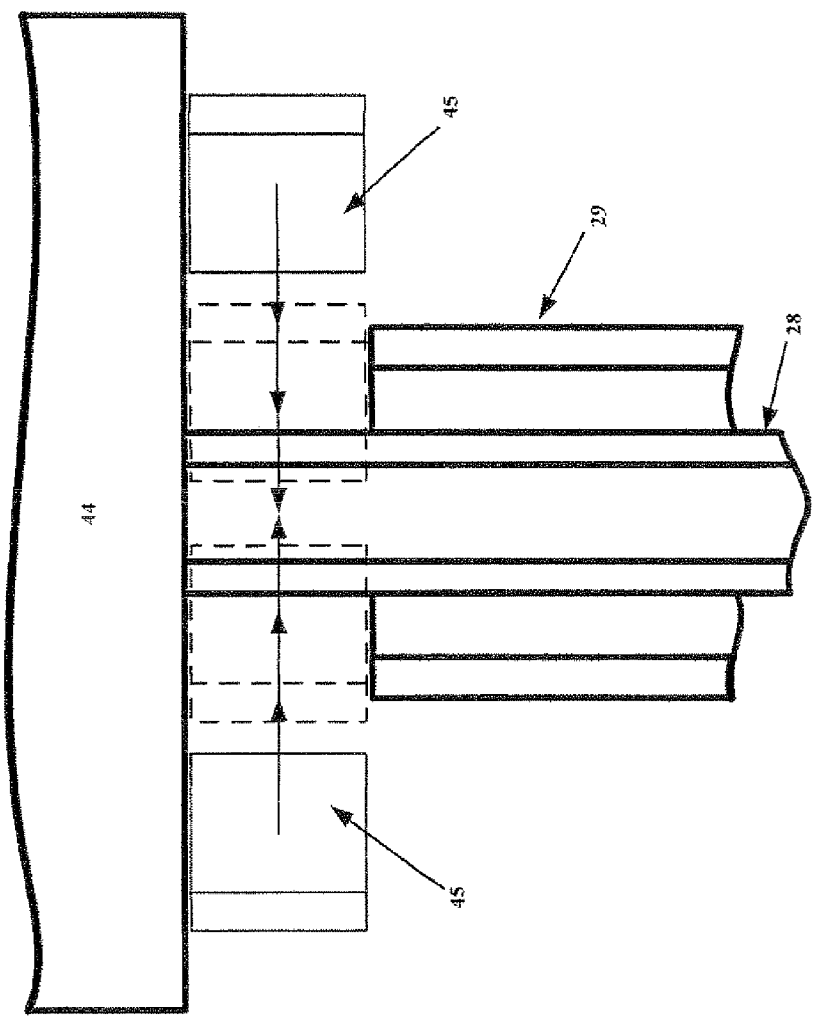
FIG. 9 illustrates a joint between a mid-line unit and a pipe-in-pipe joint, together with a half-shell gap filler.

In the above description mention is made of employment with pipe-in-pipe constructions of pipe. To facilitate joining of MLUs and PLETs etc. to the pipe-in-pipe end held in the HOC 9, the inner pipe is pulled out from inside the outer pipe by the tensioner and/or the reel. This allows the unit to be joined to the inner pipe, and then lowered down to contact the outer pipe to make the final joint. The two (twin) twister arrangements such as described above particularly facilitate this type of joining process. Without such a take-up facility for the inner pipe, there will be a gap between the unit and the outer pipe and joining the two would required bespoke half-shells to fill the gap, such as illustrated in FIG. 9. This Figure shows jointing of a pipe-in-pipe construction with an inner pipe 28 and an outer pipe 29 to an MLU 44, the inner pipe 28 being joined directly to the MLU 44 whereas the outer pipe 29 employs half-shells 45 moved in position to-fill the gap between the outer pipe end and the MLU as illustrated. The MLU could alternatively be a PLET or another such device attached to the pipe-in-pipe.

A number of particular embodiments will now be described with reference to the remaining drawings.

Referring firstly to FIGS. 10*a* to 10*h* which relate to the use of a twister 15 in connection with a single pipe 10 and using a vessel support structure 18 and an HOC 9 together with tensioner 6. In FIGS. 10 to 15 the brake actuator assembly 25 is shown up or down the guide rod 27 as appropriate for the particular operation stages.

Figure 10C:
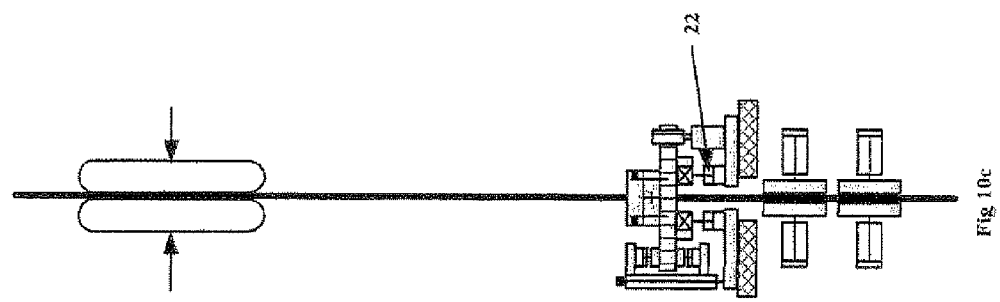
Figure 10B:
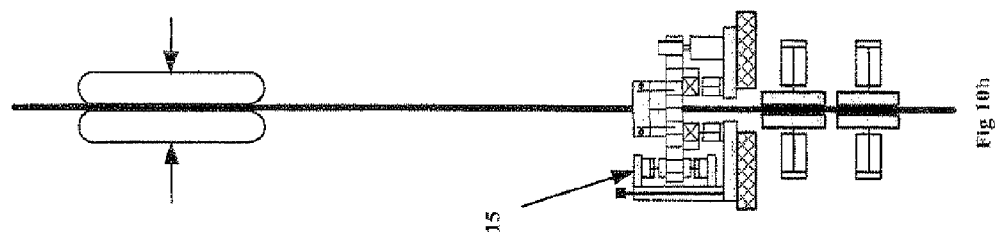
Figure 10A:
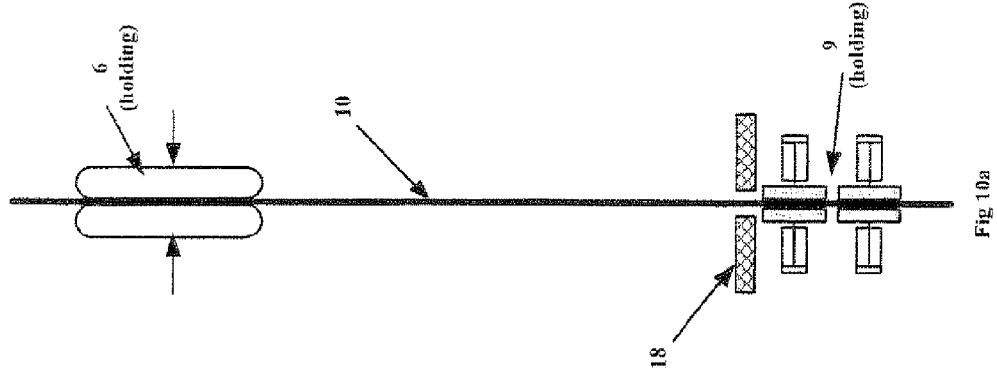

The pipe 10 is laid in the normal manner down the pipelay ramp 3 and held by the tensioner 6 and the HOC 9 as illustrated in FIG. 10*a*.

The twister 15 is landed on the VSS trolley 32, in the stowed position 34, and then deployed so that it is installed around the pipe 10 by movement of the trolley to the working position.

When the twister is installed the brake is applied as indicated in FIG. 10*b*. The clamping means 19 are tightened as necessary and their anticipated holding capacity is tested by using the pipe-tensioning cylinders 22 to provide a predetermined overload, typically +10 to 20%, with the tensioner β released. This is illustrated in FIG. 10*c*.

With the brake applied to the turntable 20, the pipe 10 is cue just above the twister 15, and the upper part is lifted clear using the tensioner and/or the storage reel 1, thus resulting in a gap 46 in the pipe string as illustrated in.

FIG. 10*d*. This can also be achieved by cutting out a section rather than adjusting the upper length by back-winding onto the reel. Back-winding requires careful control of the reel movement and tensioner load.

The HOC 9 is released, and then the brake 25, so that the pipe 10 is allowed to untwist, under the control of the torsional damper 26, as illustrated in FIG. 10*e*.

Subsequently the brake 25 is re-applied. The pipe-tensioning cylinders 22 are released. The situation as illustrated in FIG. 10*f* then applies, and further casks can be performed, such as the installation of mid/end line modules, pipe joints etc. can then be carried out as illustrated in FIG. 10*g* or FIG. 101. This is done using the tensioner 6, the thrust bearing 21 and the pipe-tensioning cylinders 22, and the appropriate torque/axial application necessary to align the welded pipe joints. The axial/rotational movement required for alignment will require the HOC to be released, but it may be re-applied as necessary to provide additional security.

FIG. 10*g* illustrates schematically insertion of a mid-line unit and welding to pipeline ends including using the tensioner, pipe-tensioning cylinders and/or torque drive to align the joint. FIGS. 10*i* and 10*j* are the same as the processes involved in FIGS. 10*d* and 10*e*, but are described as a process for use concerning pipeline end terminations (PLETs), FIG. 10*k* differs from FIG. 10*f* in requiring the upper pipe section to be removed, and then in FIG. 101 the tensioner 6 is released and A&R winch line 13 is used to bring a PLET 47 into position relative to the pipeline end for joining thereto, this involving using the A&R winch, the pipe-tensioning cylinders and/or torque drive to align the points.

As illustrated in FIG. 10*h*, the VSS support structure is moved to transfer the twister to the stowed position, and the twister 15 if required can be removed from the trolley 32, the HOC 9 can be moved to its stowed position, and using the tensioner 6 in driving mode, the tensioner can be used to lower the MLU into the sea. The dashed illustration of the HOC, the VSS and the twister indicates their removal from the lay path to permit lowering of the MLU or the PLET into the 5 sea.

Alternatively, in connection with the PLET, as illustrated in FIG. 10*m*, the twister is removed to the stowed position and if required can be subsequently removed from the trolley, and 1.0 the HOC also removed to the stowed position, and with the tensioner still released the A&R winch is used to lower the PLET into the sea.

In other words, as appropriate, the twister, the VSS and the 15 HOC are moved out of the lay path, and the pipe lay and the module deployment etc. continued.

It should be noted, that it is also possible to use the twister in a similar fashion for controlled relative rotation 0 e.g. torsion relief prior to other pipeline operations, such as A&R operations; joining the end of a previously laid pipe to a "new" pipeline section etc.

Whereas the process described with reference to the various 5 steps illustrated with reference to FIG. 10 involves a number of steps, the overall process for relieving the torsion and completing the other steps is considered to be of the order of 50% quicker than the prior art technique mentioned above.

The holding power of the clamping means (securing means/pipe retainer) can be physically tested in the processing according to the invention, whereas the welded joint used bathe prior art for the A&R connection is reliant solely on welding procedures and non-destructive testing.

Additionally, in the present case, the pipe untwists itself under control of the brake and the torsional damper, whereas the prior art system has no such control means.

Furthermore the present processing requires no critical welded joints, and rigging/de-rigging of the A&R winch is avoided. Use of the pipe-tensioning cylinders 22, and torque application to lift and/or twist the pipe, facilitates alignment of the pipe joint faces and the jointing processes.

Whereas the arrangement described with reference to FIG. 10 involved use of the VSS, an embodiment of twister for a single pipe but using the Top Hat arrangement previously referred to will now; be described.

As illustrated in FIG. 11*a* the pipe 10 is laid in the normal way down the pipelay ramp 3 and held by the tensioner 6 and the HOC S. Subsequently, as illustrated in Figure lib, the pipe is held solely by the tensioner 5 and the HOC 9 is fully opened (released).

The Top Hat device 37 is then installed in the HOC 9, which is adjusted to grip it. See FIG. 11*c*. The twister 15 is set on the Top Hat 37 and installed around the pipe 10, and the brake applied, as indicated in FIG. 11*d*. The clamping means 19 is tightened as necessary to take up the pipe weight and tested using the pipe-tensioning cylinders 22, as described above in connection with FIG. 10. This is as illustrated in FIG. 11*e*.

With the brake applied to the turntable 20, the pipe 10 is cut just above the HOC 9, twister 15 and Top Hat 37, and the upper part lifted clear using the tensioner 6 and/or the pipe storage reel 1, resulting in a gap 46 in the pipe string as indicated in FIG. 11f. As described above, back winding could be used to generate the gap 46 following cutting. Alternatively a piece of the pipe 10 can simply be cut out to provide the gap.

With the brake 25 released, the pipe 10 held in the clamping means 19 un-twists, under the control of the torsional damper 26, as illustrated in FIG. 11g.

The brake 25 is then reapplied and the pipe tension released via the pipe-tensioning cylinders 22 as illustrated in FIG. 11h.

A mid/end-line module 44 may then be installed as described in connection with FIG. 10 but as illustrated in FIG. 11i. As illustrated in FIG. 11j, subsequent operations involve removing the twister 15 and the Top Hat 37 and returning the HOC c o the stowed position in order to enable the tensioner 6 to be driven and lower the MLU 44 into the sea.

Figure 2D:
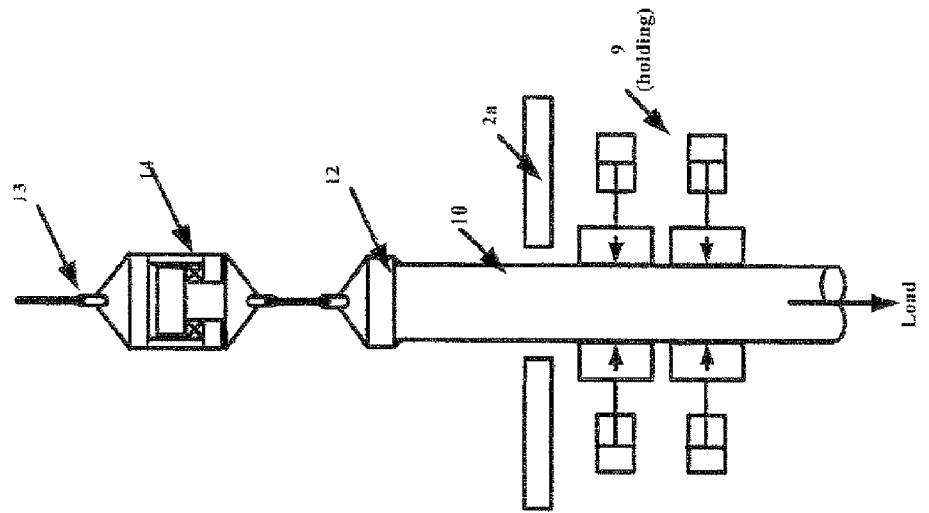
Figure 2E:
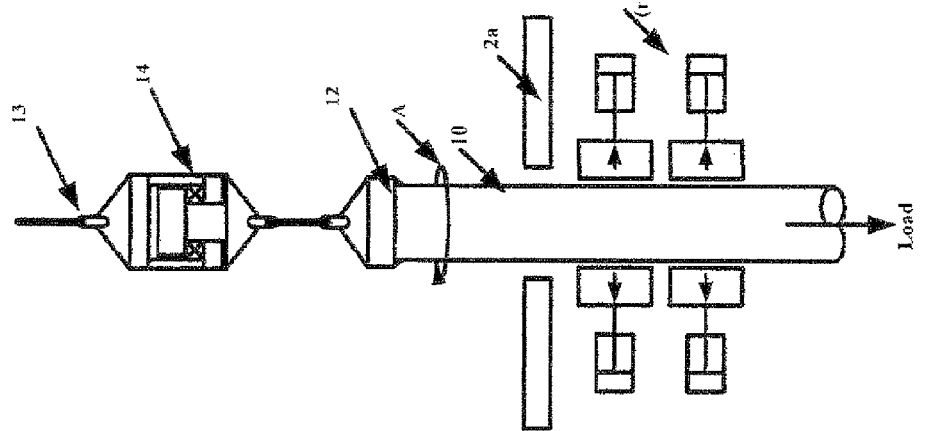
Figure 2F:
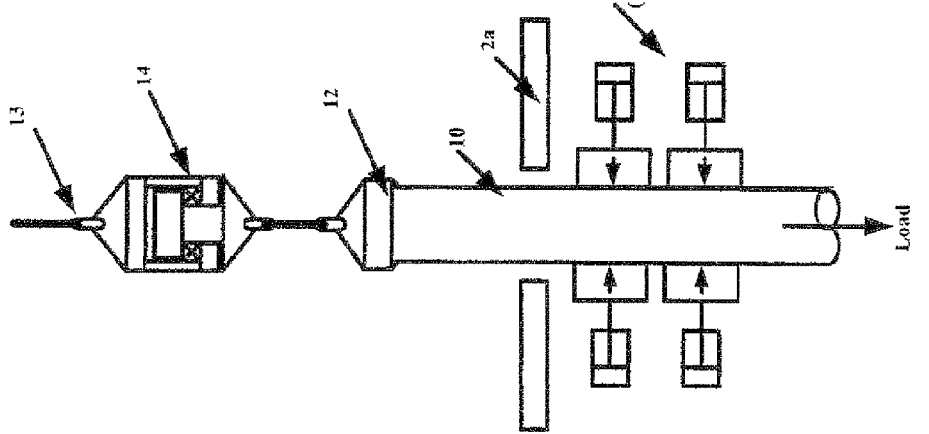

Alternatively, as illustrated in FIGS. 11k to 11o, the steps of FIGS. 11f to 11j can be replaced by steps involving attaching a pipeline end termination PLET 47 to the pipeline end, as also described with reference to FIG. 10, and subsequently removing the twister 15 and the Top Hat 37 and moving the HOC to the stowed position in order to facilitate lowering of the PLET 44 into the sea by means of the A&R winch line 13, rather than driving by means of the pensioner 6, Whereas a PLET or an MLU are referred to above, they could be replaced by an A&R head as shown in FIG. 2 for straightforward lay down or abandonment of the pipe.

As described with reference to FIG. 10 the subsequent task of installing raid/end-line modules, pipe joints etc., are executed by using the tensioner 6 the pipe-tensioning cylinders 22 and torque application as necessary in order to align welded pipe joints. It will be noted that it is also possible to use the twister 15 in a similar fashion for controlled relative rotation e.g. torsion relief prior to other pipelaying operations, such as A&R operations; joining the end of a previously laid pipe to a new pipeline section etc.

In addition to the advantages provided by the basic arrangement described with reference to FIG. 10, and the VSS, the Top Hat arrangement described with reference to FIG. 11 also provides a means of adapting the HOC 9 to accommodate variations in the pipe or the pipe end configuration, for example bend restrictors.

As will be appreciated, FIG. 10 illustrates three basic steps in FIGS. 10a, 10b and 10c and then these can be followed by the steps of FIGS. 10d to 10h or FIGS. 10i to 10m, depending on whether an MLU 44 or a PLET 47 are employed, Similarly FIGS. 11a to 11e are common steps whereas FIGS. 11f to 11j relate to an MLU 44, and in the alternative FIGS. 11k to 11o relate to a PLET 47.

The embodiments described so far are in connection with a single pipe, and various processes relating to a pipe-in-pipe construction will now be described.

Firstly a process involving a single twister with slip wedge elements and using a VSS will be described with reference to FIG. 12, This particularly involves an MLU 44, but alternatively it could involve a PLET.

As described above, when working with a pipe-in-pipe construction it is necessary to be able to fix the inner pipe to the outer pipe so that when the inner pipe is cut it is prevented from falling irretrievably down inside the outer pipe. On the assumption that, unlike the outer pipe, the inner pipe does not acquire a residual torsion during the lay process, then once the torque has been released from the outer pipe, the inner and outer pipes can be locked together using pairs of wedges referred to as a slip wedge element.

The apparatus required for this embodiment comprises a twister 15 as employed in connection with the embodiments of FIGS. 10 and 11, the support is by way of the VSS as described in connection with the embodiment of FIG. 10, and the slip wedge elements 30 comprise pairs of wedges which are fitted face to face in the annulus between the inner and outer pipe as illustrated in FIGS. 5 and 5a. Their sloping faces are angled such that the tendency of the inner pipe 28 to move downwards under its own weight causes a wedging action that forces the two wedges apart, thereby increasing their grip on the two pipes 28 and 29. This grip is sized to prevent the inner pipe 28 from sliding down inside the outer pipe 23, To release the slips 30, the inner pipe 28 has to be pulled upward relative to the outer pipe 29, in order to reverse the wedge effect.

The processing steps are as described in the following with reference to FIGS. 12a to 12m. The pipe-in-pipe 10 is laid in the normal manner down the pipelay ramp 3 and held by the tensioner 6 and the HOC 9. The VSS 18 is deployed appropriately relative to the pipe and the HOC 9 and subsequently as illustrated in FIG. 12b the twister 15 is landed on the VSS 18 and deployed around the pipe-m-pipe 10 as described above. The brake is applied and the clamping means 19 tightened as necessary and their holding capacity tested by using the pipe-tensioning cylinders 22" to provide a predetermined overload, as discussed above. This is the situation as illustrated in FIG. 12c.

With the brake applied to the turntable the outer pipe 29 of the pipe-in-pipe construction 10 is cut just above the clamping means 19. Because of the presence of the inner pipe 28, this operation involves upper and lower circumferential cuts together with longitudinal cuts between them, the latter dividing the pipe cylinder into two halves that can be removed from around the inner pipe, as illustrated in FIG. 12d.

The brake system 25 is then released and the pipe-in-pipe outer pipe 29 then allowed to untwist as indicated by arrow A under the control of the drive means/torsional damper 26. This is as illustrated in FIG. 12e.

Using the tensioner 6 the inner pipe 28 is then lifted inside the outer pipe 29 to facilitate subsequent joining of MLUs and PLETs to the pipe-in-pipe end held in the HOC S. Rather than using the tensioner, the pipe storage reel can be operated for this purpose, or the two used in combination. The slip wedge elements 30 are then fitted as illustrated in FIG. 12f and the inner pipe then lowered as illustrated in FIG. 12g to ensure that it is locked to the outer pipe by the slip elements 30.

The subsequent tasks such as installation of an MLU 44 are then carried out in a similar manner to the processing steps described above in connection with FIGS. 10 and 11. In this case the processing involves cutting out the inner pipe section 49, as illustrated in FIGS. 12h and 12i, lifting in and welding the MLU, and adjusting the pipe-in-pipe lengths and the MLU position as necessary as indicated in FIG. 12j. Using the tensioner 6 the mid-line unit 44 can then be lifted and the slip wedge elements 30 removed as indicated in FIG. 12k. The tensioner 6, the pipe-tensioning cylinders 22 and torque application via the drive means 25 are used as necessary to align the welded pipe joints, the MLU being lowered by the tensioner 6 as indicated in FIG. 12l. Subsequently the twister 15, the VSS 18 and the HOC 9 are moved out of the lay path and the pipelay and module deployment continued, using the tensioner 6 to drive the MLU 44 into the sea, as illustrated in FIG. 12m.

As mentioned above, it is also possible to use the twister 15 in a similar fashion for controlled relative rotation, e.g. torsion relief, prior to other pipelay operations, such as A&R operations; joining the end of a previously laid pipe to a new pipeline section etc.

The advantages provided by this particular embodiment are those provided for the basic embodiment employing a single pipe, except that in this case the advantages are provided for a pipe-m-pipe construction.

Another variant will now be described with reference to FIG. 13 which comprises use of a Top Hat structure in connection with a pipe-in-pipe construction and a PLST, although an MLU could be similarly installed.

An embodiment in which a single twister with slip wedge elements installed on a Top Hat is employed in connection with a pipe-in-pipe construction, and involving a PLET, will now be described with reference to FIG. 13, although it could alternatively be employed in connection with an MLU.

The pipe-in-pipe construction 10 is laid in the normal way down the pipelay ramp 3, the pipe-in-pipe construction 10 being held by the tensioner 6 and the HOC 9 initially as illustrated in FIG. 13a. Subsequently the KOC 9 is opened as illustrated in FIG. 13b and the Top Han 37 installed in the HOC 9, which is adjusted to grip the Top Hat 37, so that the arrangement is as illustrated in FIG. 13c.

The twister 15 is then set on the Top Hat 37 and installed around the pipe-in-pipe construction 10, and the brake applied to the turntable, as illustrated in FIG. 13d. The pipe weight is thus taken up by the twister 15 and the clamping means 19 tested by means of the pipe-tensioning cylinders 22, as discussed above, the situation then being as illustrated in FIG. 13e.

Then with the brake applied, as illustrated in FIG. 13f, the outer pipe is then removed in half sections 48, as discussed above in connection with FIG. 12.

The brake system 25 is then released and the pipe allowed to untwist under the control of the torsional damper 26 as illustrated in FIG. 13g.

Using the tensioner 6 the inner pipe is then lifted inside the outer pipe and the slip wedge elements 30 installed, as described above with reference to FIG. 12. The pipe storage reel 1 can be employed for the lifting rather than the tensioner 6 as also described above, or the two used in combination.

With the slip wedge elements 30 fitted, the inner pipe is 5 lowered as indicated in FIG. 13i to confirm that it is locked to the outer pipe, and the subsequent steps may be as illustrated in FIGS. 13j to 13o, which involve cutting out an inner pipe section 49, releasing the tensioner 6 and removing the upper pipe-in-pipe length as indicated, in FIG. 1.0 13k. and then rigging the A&R winch line 13 to lifting a PLET 47, welding the joints to the PLET 47 whilst adjusting the pipe-iii-pipe length as necessary, as illustrated in FIG. 13l.

Using the A&R winch no lift the PLET enables the slip wedge elements to be removed, as illustrated in FIG. 13m. Subsequently the A&R winch is used to lower the PLET 47 which is then welded to the pipe-in-pipe 10 end, adjusting the outer pipe length as necessary. This may include using the 20 pipe-tensioning cylinders 22 and/or the drive means 26 to align the joints, as illustrated in FIG. 13n. Subsequently the twister 15 and the Top Hat 37 are removed and the HOC 9 moved to the stowed position, whereupon the A&R winch is used to lower the PLET 47 into the sea, as indicated in FIG. 13o.

As described above, as pipelay moves into ever deeper waters, the inner pipe of a pipe-in-pipe construction may be found to acquire a residual twist, which may or may not match that of 30 the outer pipe. In this case two twisters are required for torsion relief, one for the outer pipe and one for the inner pipe as was discussed in connection with FIG. 6.

In FIGS. 14a to 14k there is illustrated use of an arrangement including two twisters in connection with a VSS structure IS for the first installed lower twister 15 and a frame structure 31 for the installment of an upper twister 50. The two twisters use basically identical components except that the top unit 50 uses smaller versions to reflect the smaller pipe diameter. The two twisters 15 and 50 are joined by frame 31 which positions the upper twister 50 at the required distance from the lower twister 15. This is because of the need to grip the inner pipe above the outer pipe. The frame 31 is removable along with the upper twister 50 in order to accommodate the steps needed to achieve a weld to the end of the inner pipe and. then of the outer pipe adjacent to the HOC 9.

Figure 14C:
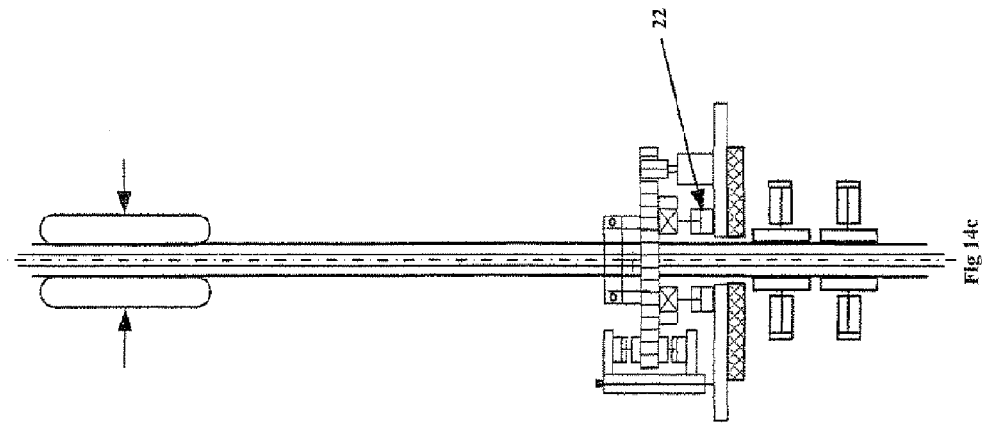
Figure 14B:
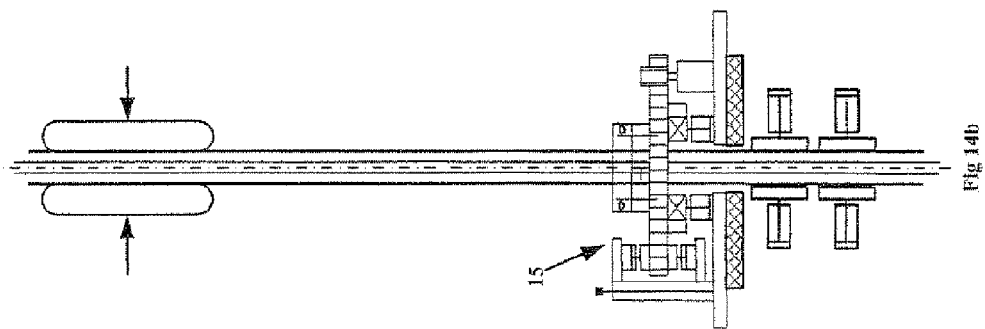
Figure 14A:
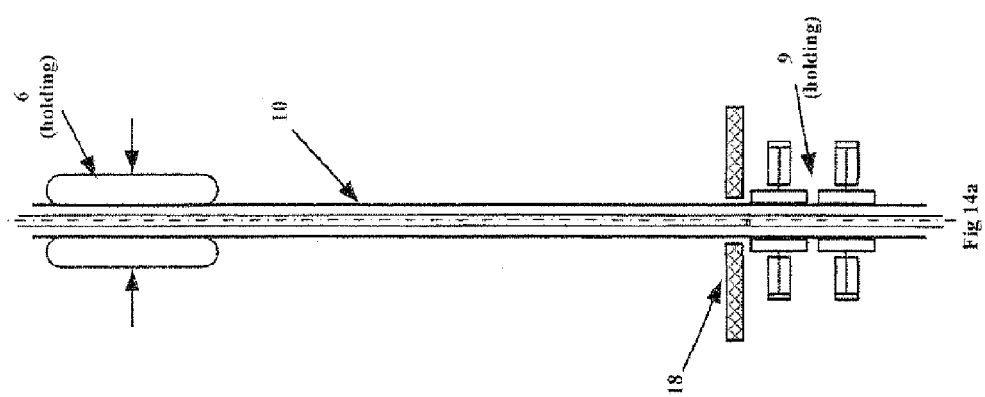

The process involving this apparatus comprises the steps of laying the pipe-in-pipe 10 in the normal way down the pipelay ramp 3, with the pipe-in-pipe 10 held by the tensioner 6 and the KOC 9 as illustrated in FIG. 14a. The VSS 18 is deployed into the appropriate position and the lower twister 15 landed on and deployed by the VSS 18 and installed around the outer pipe 29 of the pipe-in-pipe 10. The clamping means 19 are tightened as necessary and their anticipated holding capacity tested by using the pipe-tensioning cylinders 22 which provide a predetermined overload. This is as illustrated in FIGS. 14b and 14c respectively.

With the brake 25 applied to the turntable, the outer pipe 29 of the pipe-in-pipe construction 10 is cut just above the clamping means 19, and removed as two outer pipe half sections 48 as described above and illustrated in FIG. 14d, The upper twister 50 is then installed on its frame 31, previously discussed in connection with FIG. 6, and positioned around the inner pipe 28 and the respective brake applied. The upper clamping means 19 are tightened as necessary and their anticipated holding capacity tested in the manner described above.

The inner pipe section 49 is then cut out as illustrated in FIG. 14f, the load on the pipe extending into the sea being supported by the twisters 15 and 50 via the VSS structure 18 on the pipelay vessel.

The brakes of the upper and lower twisters are then released and as illustrated in FIG. 14g the pipe-in-pipe inner and outer pipes then untwist under the control of their respective torsional dampers 26.

As illustrated in FIG. 14h the tensioner 6 can be released and the upper length of the pipe-in-pipe construction removed, and the A&R winch wire 13 rigged, and with the tensioner 6 still released a PLET 47 can be lifted into position and subsequently welded in place. The inner pipe can be lifted inside the outer pipe using the pipe-tensioning cylinders 22 to facilitate jointing of the unit and the inner pipe.

Subsequently the upper twister 50 and the frame 31 are removed and the PLET unit 47 welded to the outer pipe 29, the pipe-tensioning cylinders 22 of the lower twister 15 being used to adjust the outer pipe length as necessary, and the drive means 26 can be driven to align welded pipe joints as necessary. This is illustrated schematically in FIG. 14j.

The lower twister 15 is then removed from the VSS 18, and the VSS 18 and the HOC 9 are removed to stowed positions out of the lay path so chat the pipelay and the PLET module deployment can be continued by lowering into the sea using the A&R winch, as illustrated schematically in FIG. 14k.

As discussed above, where appropriate it is also possible to use the twin twister in a similar fashion for controlled relative rotation, e.g. torsion relief, prior to other pipelay operations, such as: A&R operations; joining the end of a previously laid pipe to a new pipeline etc.

The pipe-in-pipe twin twister arrangement is described in connection with a VSS in FIG. 14. However, a variant is to employ a twin twister arrangement together with a Top Hat, and such an arrangement and process is illustrated in FIGS. 15a to 15m.

The pipe-in-pipe 10 is laid in the normal way down the pipelay ramp 3 and initially held by both the tensioners 6 and the HOC 9, "as illustrated in FIG. 15a. Subsequently the HOC 9 is opened, as illustrated in FIG. 15b, and a Top Hat structure 37 installed into the HOC and gripped thereby, as illustrated in FIG. 15c, The lower twister 15 is then set on the Top Hat 37 and installed around the outer pipe 29 of the pipe-in-pipe constructions 10. The clamping means IS are tightened as necessary and their anticipated holding capacity tested as described before by means of the pipe-pensioning cylinders 22, This is as illustrated in FIGS. 15d and 15e.

With the brake applied to the turntable of the lower twister 15, the outer pipe of the pipe-m-pipe, construction 10 is cut; just above the clamping means 19 and removed as two half sections 48, as illustrated in FIG. 15f. The upper twister 50 is then installed together with its frame 31, around the inner pipe 28 and its brake applied. The clamping means 19 of the upper twister 50 are tightened as necessary and their anticipated holding capacity tested as previously described. The inner pipe section 49 is removed (FIG. 15h), and then both the brakes of the upper and lower twisters are released so that the pipe-in-pipe inner and outer pipes then untwist under the control of their respective torsional dampers 26. This is as illustrated in FIG. 15i.

The tensioner 6 is then used to adjust the upper section of the pipe-in-pipe construction (FIG. 15j) to create a suitable gap into which an MLU 44 can be lifted and then welded to the upper inner pipe 28 and outer pipes 29. It is then welded to the lower inner pipe, using the pipe-tensioning cylinders 22 to adjust the length of the inner pipe and facilitate jointing to the MLU 44 as required. This is as illustrated in FIG. 15k.

Subsequently the upper twister unit 50 and its frame are removed and the MLU 44 connected to the outer pipe 29, using the pipe-tensioning cylinders 22 to adjust pipe length as necessary and the drive means 26 to adjust the alignment of the welded pipe joints as necessary. This is illustrated schematically in FIG. 151.

The lower twister 15 is then removed together with the Top Hat 37 and the HOC 9 is moved to a stowed position out of the lay path, then the KLU and the pipe lay can be continued using the tensioner 6 to lower them into the sea as illustrated schematically in FIG. 15m. Whereas use with an MLU is described, it could alternatively be used with a PLET or simple A&R head deployment of the pipe to the sea bed.

As discussed above in connection with other embodiments, it will also be possible to use the twin twister arrangement described with reference to FIG. 15 in a similar fashion for controlled relative rotation, e.g., torsion relief prior to other pipelay operations, such as: A&R operations; joining the end of a previously laid pipe to a new pipeline section etc.

Whereas the last described arrangement involved an MLU, it could alternatively be employed in connection with a PLET, and similarly the arrangement described with reference to FIG. 14 could be used with an MLU instead of a PLET as described.

There are many possible combinations of the described apparatus but only some of them are particularly described above in connection with the drawings.

Whereas the securing means has been described above as a clamping means 19 comprising a pair of bear grips, this is not the only possibility. Two particular alternatives are an internal gripping device or a flange retainer.

An internal gripping device can take a number of forms, two particular examples being a ball grab or toothed jaws, both of which are illustrated in FIG. 16, which shows an internal pipe gripping assembly 60 having a cylindrical probe equipped with rows of balls 64 that extend around its circumference. The probe is inserted into the pipe 10 and the balls 64 are pushed into contact with the pipe bore by an internal mechanism (not shown). Any small movement of the pipe 10 under load causes the balls to roll up ramps that increase their contact pressure on the pipe bore. The ramps are configured so that the friction load generated is always higher than the loading from the pipe 10, which is thus retained. The unit is released by removing the ramps from behind the balls. As shown in FIG. 16, the pipe gripping assembly 60, 64 together with a spacer 61, which may be in two parts secured together by spacer fixing bolts 63, can be configured to rest on, and connect with, the twister turntable 20, which overall assembly then operates in a similar manner to that described above with respect to the pair of bear grips 19. After release of the residual twist, an A&R winch wire (not shown in FIG. 16) can be connected to a pad eye 65 on the top face of the assembly 60, and the pipe end lowered to the sea bed in the usual way using the A&R winch.

Alternatively, the balls 64 are replaced by rows of "toothed jaws" 62. These jaws 62 are pressed into contact with the pipe bore by an internal mechanism, such as described above with reference to balls 64. In a similar manner to the slip wedge elements described above with reference to FIGS. 5 and 5a, any small movement of the pipe under load causes the jaws to slide up a ramp, thus increasing the contact pressure of their teeth on the pipe bore. As for the ball grab approach, the friction load generated is always higher than the loading from the pipe, which is thus retained. The unit is released by removing the ramps from behind the jaws. As shown in FIG. 16 and discussed above with respect to the ball grab version, the jawed unit can be configured to rest on and connect with the twister turntable by means of spacer 61, and after release of the residual twist an A&R winch wire can be connected to the pad eye £5 and the pipe end lowered.

Figure 17:
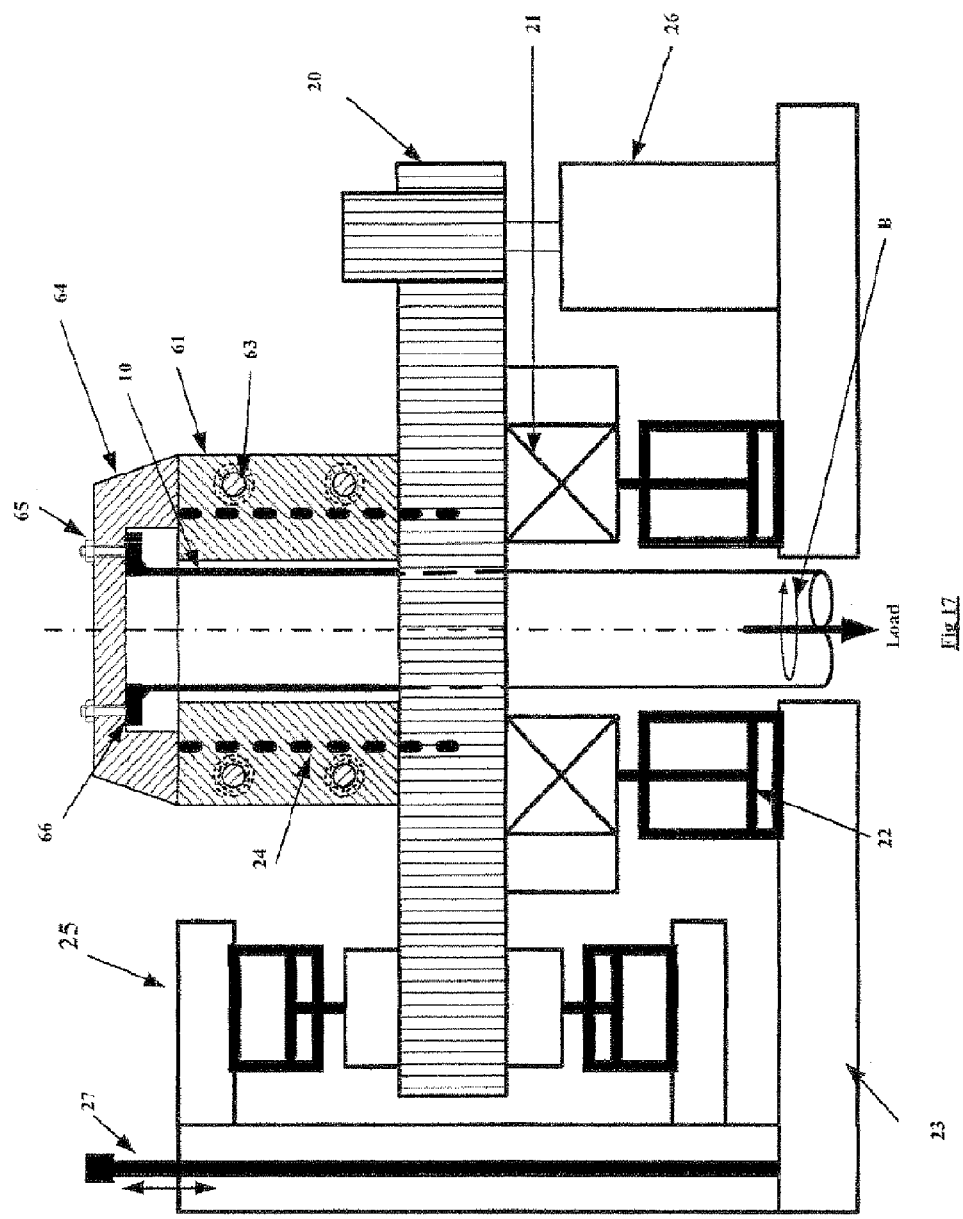

An alternative securing means in the form of a flange retainer will now be described with reference to FIG. 17. As part of the pipe laying process it is sometimes necessary to weld a flange 67 to the end of the pipe 10. If pipe lay down or abandonment is required, a pipe retaining cap 68 can be bolted to the flange 67 by pipe retaining studs 66. The cap 68 together with a two part spacer 69, secured together by fixing bolts 70, can rest on and be secured to the twister turntable 20. After release of the residual twist, an A&R winch wire can be connected to pad eye 65 and the pipe end lowered to the sea bed in the usual way using the A&R winch.

The basic feature of the apparatus of the present invention is a so-called twister which comes in three basic forms, namely a version for a single pipe, a version for a pipe-in-pipe construction using slip wedge elements and a version for a pipe-in-pipe construction using two twister units in tandem. As described these can all be located on either a vessel support structure VSS or a Top Hat arrangement disposed in the hold off clamp. The twister is disposed in the lay path and on the pipelay ramp and positioned between the tensioner and a VSS, when used, or the tensioner and the hold off clamp when the VSS is not used.

Prom the foregoing description, it will be appreciated that the described embodiments offer the significant advantages of enabling torsional relief to be obtained in approximately half the time of the prior technique, the holding power of the clamping means can be physically tested, the pipe untwists in a controlled manner, and alignment of joint faces is facilitated.

The invention claimed is:

1. An apparatus adapted to achieve controlled relative rotation between a pipe being laid on the sea floor from a floating pipelay vessel and the pipelay vessel, the apparatus comprising:
a clamp disposable on the pipelay vessel and adapted to be secured to the pipe at a position along a lay path of a pipelay structure of the pipelay vessel, said position being taken by the pipe during laying from the pipelay vessel when said relative rotation is required, said clamp being adapted to support the weight of the laid pipe; and
a mounting system for said clamp adapted to provide controlled relative rotation of the clamp with respect to the pipelay vessel, wherein said mounting system comprises a brake assembly capable of preventing said relative rotation and a drive assembly capable of providing predetermined rotation and torsional damping, wherein the mounting system comprises a turntable, a framework, and a thrust bearing, and wherein said clamp is secured to the turntable and supported for rotation on the framework of the mounting system via the thrust bearing of the mounting system, and wherein the brake assembly is associated with the turntable and comprises a brake disc, disc pads co-operable with the brake disc, and a brake actuator, and wherein the drive assembly is a drive motor or torsional damping unit mounted on the framework and engageable with the turntable for said rotation and damping.

2. An apparatus adapted to achieve controlled relative rotation between a pipe being laid on the sea floor from a floating pipelay vessel and the pipelay vessel, the apparatus comprising:
a clamp disposable on the pipelay vessel and adapted to be secured to thepipe at a position along a lay path of a pipelay structure of the pipelay vessel, said position being taken by the pipe during laying from the pipelay vessel when said relative rotation is required, said clamp being adapted to support the weight of the laid pipe; and
a mounting system for said clamp adapted to provide controlled relative rotation of the clamp with respect to the pipelay vessel, wherein said mounting system comprises a brake assembly capable of preventing said relative rotation and a drive assembly capable of providing predetermined rotation and torsional damping, wherein the mounting system comprises a turntable, a framework, a thrust bearing, and pipe-tensioning cylinders, and wherein said clamp is secured to the turntable and supported by the turntable for rotation on the framework of the mounting system via the thrust bearing and the pipe-tensioning cylinders, the pipe-tensioning cylinders being adapted to preload the thrust bearing to the weight of the pipe before the clamp alone is required to support the weight of the pipe during use of the apparatus.

3. The apparatus of claim 2, wherein the clamp is configured to position the pipe for attachment to a second member in a manner that aligns the pipe and second member, and wherein the drive assembly is adapted to rotationally align faces of the pipe and the second member for said connection and the pipe tensioning cylinders are adapted to provide axial movement of the secured pipe for alignment of the faces to be joined.

4. An apparatus adapted to achieve controlled relative rotation between a pipe being laid on the sea floor from a floating pipelay vessel and the pipelay vessel, the apparatus comprising:
a clamp disposable on the pipelay vessel and adapted to be secured to the pipe at a position along a lay ath of a pipelay structure of the pipelay vessel said position being taken by the pipe during laying from the pipelay vessel when said relative rotation is required, said clamp being adapted to support the weight of the laid pipe; and
a mounting system for said clamp adapted to provide controlled relative rotation of the clamp with respect to the pipelay vessel, wherein said mounting system comprises a brake assembly capable of preventing said relative rotation and a drive assembly capable of providing predetermined rotation and torsional damping,
wherein the clamp is configured to position the pipe for attachment to a second member in a manner that aligns the pipe and second member, and wherein the drive assembly is adapted to rotationally align faces of the pipe and the second member for said connection,
wherein the apparatus is usable in a pipe-in-pipe construction of pipe having an inner pipe and an outer pipe, wherein said pipe comprises the outer pipe and the second member comprises the inner pipe, the apparatus further comprising slip wedges sized and shaped to be disposed between the inner pipe and the outer pipe upon removal of the outer pipe above the clamp and before the inner pipe is cut, the slip wedges being configured to lock the inner pipe to the outer pipe.

5. The apparatus of claim 4, wherein said clamp is adapted to be clamped around the circumference of the pipe.

6. The apparatus of claim 4, further comprising a vessel support structure structurally configured to support the clamp and the mounting system and to deploy the clamp and the mounting system on the pipelay vessel into the vicinity of the lay path from a stowed position.

7. The apparatus of claim 4, comprising:
the pipelay structure; and
a hold off clamp mounted to the pipelay structure, the pipelay structure comprising a pipelay ramp and further comprising a support structure for the clamp and the mounting system, the support structure being shaped and positioned to be gripped by the hold off clamp.

8. The apparatus of claim 4, wherein said clamp is an internal pipe gripping assembly.

9. The apparatus of claim 4, wherein said clamp is a flange retainer including a flange welded to a pipe end.

10. An apparatus adapted to achieve controlled relative rotation between a pipe, being laid on the sea floor from a floating pipelay vessel, and the pipelay vessel, the apparatus being usable in a pipe-in-pipe construction of pipe having an inner pipe and an outer pipe and comprising:
a first clamp and a second clamp for disposal on the pipelay vessel, adapted to be secured to the pipe at a position along a lay path, of a pipelay structure of the pipelay vessel, said position being taken by the pipe during laying from the pipelay vessel, when said relative rotation is required, wherein the first clamp is adapted to secure the outer pipe and the second clamp is adapted to secure the inner pipe after the outer pipe is removed above the first clamp, and wherein said first clamp is adapted to support a whole weight of the pipe-in-pipe construction laid by the pipelay vessel, and wherein the second clamp is adapted to support a whole weight of the inner pipe laid by the pipelay vessel; and
for each of the first and second clamps a respective mounting system adapted to provide a respective controllable relative rotation of the inner and outer pipes with respect to the pipelay vessel.

11. A method for laying pipe on a sea floor from a floating pipelay vessel, comprising the steps of:

mounting a clamp to the pipelay vessel via a mounting system adapted to provide controlled relative rotation of the clamp with respect to the pipelay vessel, wherein the mounted clamp is adapted to support the weight of the pipe and the mounting system comprises rises a brake assembly capable of preventing said relative rotation and drive means capable of providing predetermined rotation and torsional damping;

securing the pipe in the clamp; and performing controlled relative rotation of the securing means with respect to the pipelay vessel, comprising releasing the brake assembly to permit said relative rotation and using the drive assembly to provide damping of the relative rotation or to achieve a predetermined relative rotation, wherein the clamp is secured to a turntable of the mounting system and supported for rotation on a framework of the mounting system via a thrust bearing and pipe-tensioning cylinders of the mounting system, and including the step of preloading the thrust bearing to the weight of the pipe before the clamp alone is required to support the weight of the pipe.

12. The method of claim 11, further including the step of adjusting the pipe-tensioning cylinders to provide axial movement of the secured pipe.

13. A method for laying pipe on a sea floor from a floating pipelay vessel, wherein the pipe is in a pipe-in-pipe construction having an inner pipe and an outer pipe wherein the clamp is secured to the outer pipe, the method including the steps of:

mounting a clamp to the pipelay vessel via a mounting system adapted to provide controlled relative rotation of the clamp with resect to the pipelay vessel, wherein the mounted clamp is adapted to support the weight of the pipe and the mounting system comprises a brake assembly capable of preventing said relative rotation and drive means capable of providing predetermined rotation and torsional damping;

securing the pipe in the clamp;

removing a segment the outer pipe from above the clamp, and inserting slip wedges between the inner and outer pipes prior to removal of the inner pipe from above the clamp in a manner that locks the inner pipe to the outer pipe; and performing controlled relative rotation of the securing means with respect to the pipelay vessel, comprising releasing the brake assembly to permit said relative rotation and using the drive assembly to provide damping of the relative rotation or to achieve a predetermined relative rotation.

14. The method of claim 13, wherein mounting a clamp includes clamping the pipe around its outer circumference.

15. The method of claim 13, wherein mounting a clamp includes gripping the internal circumference of the pipe.

16. The method of claim 13, wherein the clamp comprises a flange retainer including a flange welded to an end of the pipe.

17. The method of claim 13, further including the step of supporting the clamp and the mounting system on a vessel support structure adapted for deployment of the clamp and the mounting system into the vicinity of the pipe from a stowed position.

18. The method of claim 13, further including the step of supporting the clamp and the mounting system on a support structure gripped by a hold off clamp of a pipelay structure of the pipelay vessel.

19. A method of achieving controlled relative rotation between a pipe, being laid on the sea floor from a floating pipelay vessel, and the pipelay vessel, wherein the method is used in a pipe-in-pipe construction of pipe having an inner pipe and an outer pipe, the method comprising the steps of:

securing the outer pipe with a first clamp and supporting a whole weight of the pipe-in-pipe construction laid by the pipelay vessel with the first clamp;

removing the outer pipe from above the first clamp;

securing the inner pipe with a second clamp and supporting a whole weight of the inner pipe laid by the pipelay vessel with the second clamp; and performing respective controlled relative rotation of the inner and outer pipes.

20. The method of claim 19, wherein the controlled rotation is performed in order to relieve residual torsion in the pipe.

21. The method of claim 19, wherein the controlled rotation is performed in order to align the pipe with another member to be joined thereto.

* * * * *